(12) United States Patent
Dahdah et al.

(10) Patent No.: US 10,508,043 B2
(45) Date of Patent: Dec. 17, 2019

(54) THERMAL DESALINATION FOR INCREASED DISTILLATE PRODUCTION

(71) Applicants: Massachusetts Institute of Technology, Cambridge, MA (US); Rheinisch-Westfaelische Technische Hochschule Aachen, Aachen (DE)

(72) Inventors: Tawfiq Hanna Dahdah, Boston, MA (US); Alexander Mitsos, Aachen (DE)

(73) Assignees: Massachusetts Institute of Technology, Cambridge, MA (US); Rheinisch-Westfaelische Technische Hochschule Aachen, Aachen (DE)

( * ) Notice: Subject to any disclaimer, the term of this patent is extended or adjusted under 35 U.S.C. 154(b) by 1258 days.

(21) Appl. No.: 14/576,798

(22) Filed: Dec. 19, 2014

(65) Prior Publication Data

US 2015/0175442 A1    Jun. 25, 2015

Related U.S. Application Data

(60) Provisional application No. 61/919,186, filed on Dec. 20, 2013.

(51) Int. Cl.
| | |
|---|---|
| *C02F 1/06* | (2006.01) |
| *B01D 3/00* | (2006.01) |
| *B01D 3/06* | (2006.01) |
| *B01D 3/14* | (2006.01) |
| *C02F 1/04* | (2006.01) |
| *C02F 103/08* | (2006.01) |

(52) U.S. Cl.
CPC ............... *C02F 1/06* (2013.01); *B01D 3/065* (2013.01); *B01D 3/146* (2013.01); *C02F 1/041* (2013.01); *C02F 2103/08* (2013.01); *C02F 2301/08* (2013.01)

(58) Field of Classification Search
CPC ......... B01D 3/065; B01D 3/146; C02F 1/041; C02F 1/06; C02F 2103/08; C02F 2301/08
See application file for complete search history.

(56) References Cited

FOREIGN PATENT DOCUMENTS

CN         103112985 A      5/2013

OTHER PUBLICATIONS

Yeoman, H., et al., A systematic modeling framework of superstructure optimization in process synthesis, 1998, Computers and Chemical Engineering, vol. 23, pp. 709-731 (Year: 1998).*

(Continued)

*Primary Examiner* — Renee Robinson
*Assistant Examiner* — Derek N Mueller
(74) *Attorney, Agent, or Firm* — Modern Times Legal; Robert J. Sayre

(57) ABSTRACT

A superstructure for thermal desalination is optimized by controlling various parameters, wherein the variable parameters include a feed routing for flow of a liquid feed; brine routings for flow of concentrated brine from the liquid feed; vapor routings for vapor generated from the liquid feed; a series of multi-effect distillation effects, each of the effects coupled with at least one routing selected from the feed routing and the brine routings and with one of the vapor routings; and a series of multi-stage flash stages coupled with at least one routing selected from the feed routing and the brine routings and with one of the vapor routings. The superstructure may or may not contain a thermal vapor compressor.

13 Claims, 7 Drawing Sheets

(56) References Cited

OTHER PUBLICATIONS

Zak, G.M., Master's Thesis, 2012, M.I.T, pp. 1-144. (Year: 2012).*
US Patent and Trademark Office, International Search Report and Written Opinion for PCT/US14/71468 (corresponding PCT application) (dated Mar. 20, 2015).
Hisham T. El-Dessouky, et al., "Computer Simulation of the Horizontal Falling Film Desalination Plant," 55 Desalination 119-138 (1985).
Hisham T. El-Dessouky, et al., "Performance of parallel feed multiple effect evaporation system for seawater desalination," 20 Applied Thermal Engineering 1679-1706 (2000).
Hisham T. El-Dessouky, et al., "Steady-State Analysis of the Multiple Effect Evaporation Desalination Process," 21 Chem. Eng. Technol. 437-451 (1998).
Alexander Mitsos, et al., "Methodology for the Design of Man-Portable Power Generation Devices," 46 Ind. Eng. Chem. Res. 7164-7176 (2007).
Sergio F. Mussati, et al., "Novel Configuration for a Multistage Flash-Mixer Desalination System," 42 Ind. Eng. Chem. Res. 4828-4839 (2003).
Tawfiq H. Dandah and Alexander Mitsos, "Structural Optimization of seawater desalination: I. A flexible superstructure and novel MED-MSF configurations," 344 Desalination 252-265 (Apr. 18, 2014).
Tawfiq H. Dandah and Alexander Mitsos, "Structural Optimization of seawater desalination: II. novel MED-MSF-TVC configurations," 344 Desalination 219-227 (Apr. 17, 2014).
Gina M. Zak, et al., "Hybrid thermal-thermal desalination structures," 52 Desalination 2905-2919 (Jun. 14, 2013).

* cited by examiner

THERMAL DESALINATION FOR INCREASED DISTILLATE PRODUCTION

RELATED APPLICATION

This application claims the benefit of U.S. Provisional Application No. 61/919,186, filed 20 Dec. 2013, the entire content of which is incorporated herein by reference.

BACKGROUND

The global demand for a steady, economical supply of fresh water continues to increase. One of the main known modes of increasing the existing water supply is seawater desalination; a proven process that can reliably convert the seemingly limitless supply of seawater to high-quality water suitable for human consumption. Already, desalination plants operate in more than 120 countries in the world, including Saudi Arabia, the United Arab Emirates, Spain, Greece and Australia. While large-scale desalination plants have been available for a long time, further installations are expected to increase at an alarmingly fast rate, with most of the desalination plant installations expected to be of either the thermal or membrane type. It is projected that by just 2016, the global water production by desalination will increase by more than 60 percent from its value in 2010. In Gulf countries in specific, where energy costs are low and where the high salinity waters complicate the use of membrane-based technologies, thermal desalination technologies are foreseen to continue to dominate the market in the nearby future. Thus, the need to enhance thermal desalination technologies, which include the multi-effect distillation (MED) and multi-stage flash distillation (MSF) plants, continues to be a pressing issue. It has already been tackled by many authors, and will be addressed in the work presented herein.

SUMMARY

Apparatus and methods for thermal desalination are described herein, where various embodiments of the apparatus and methods may include some or all of the elements, features and steps described below.

A superstructure for thermal desalination is optimized by controlling various parameters, wherein the variable parameters include a feed routing for flow of a liquid feed; brine routings for flow of concentrated brine from the liquid feed; vapor routings for vapor generated from the liquid feed; a series of multi-effect distillation effects, each of the effects coupled with at least one routing selected from the feed routing and the brine routings and with one of the vapor routings; and a series of multi-stage flash stages coupled with at least one routing selected from the feed routing and the brine routings and with one of the vapor routings.

In various embodiments, the superstructure further comprises feed preheaters along the feed routing to exchange heat with liquid feed in the feed routing, wherein a vapor routings from at least one of the multi-effect distillation effects or the multi-stage flash stages passes through each of the feed preheaters.

In various embodiments, the superstructure further comprises split vapor routings from multi-effect distillation effects configured to split vapor from the multi-effect distillation effects (a) to the preheaters to heat the feed and (b) to subsequent effects in the series of multi-effect distillation effects to transfer heat to subsequent effects.

In various embodiments, the superstructure further comprises a down condenser, wherein the vapor routing from a final multi-effect distillation effect in the series of multi-effect distillation effects are coupled with the down condenser, and wherein the feed routing passes through the down condenser.

In various embodiments, vapor routings from multi-stage flash stages also are coupled with the down condenser. In additional embodiments, vapor routings from at least one of multi-effect distillation effects and multi-stage flash stages pass through the preheaters. In various embodiments, feed routings lead from outlets of respective feed preheaters to inlets of corresponding multi-effect distillation effect.

In various embodiments, the superstructure further comprises a series of distillate flash boxes coupled with vapor routings downstream from where the vapor routings pass through the preheaters.

In various embodiments, inlets to multi-effect distillation effects are coupled with brine routings from multi-stage flash stages and with the feed routing to feed a blend of the brine and the feed into the multi-effect distillation effect. In various embodiments, brine routings lead from outlets of multi-effect distillation effects to inlets of subsequent multi-effect distillation effects in the series. In still more embodiments, brine routings lead from outlets of multi-stage flash stages to inlets of subsequent multi-stage flash stages in the series.

In various embodiments, a series of multi-stage flash stages extend from each of a plurality of brine routings from outlets of corresponding multi-effect distillation effects. In additional embodiments, a steam routing passing through a first multi-effect distillation effect in the series of effects. In still more embodiments, the steam routing includes a thermal vapor compressor coupled with one of the vapor routings.

A method for thermal-based desalination using the superstructure includes flowing a liquid feed through the feed routing and using the preheaters to heat the liquid feed in the feed routing; flowing the liquid feed from the feed routing through the series of multi-effect distillation effects, wherein the liquid feed flows into an inlet of a first effect, where the feed liquid is heated to produce vapor and brine, and the brine flows from an outlet of the first effect flows into an inlet of a second effect; flowing a first part of the vapor produced in at least one effect through at least one of the preheaters to transfer heat from the vapor into the liquid feed in the feed routing; flowing a second part of the vapor produced in the at least one effect to a subsequent effect in the series; and flowing brine produced in each effect through a brine flash box and heating the brine to release additional vapor.

Additional exemplifications of the method include adjusting flow through the routings to achieve at least one result selected from (a) increasing the performance ratio of distillate production in the superstructure; (b) decreasing specific heat transfer area requirements in the superstructure; (c) increasing recovery ratio; and (d) increasing gained output ratio.

Additional exemplifications of the method include extracting liquid feed at various locations between different preheaters and injecting the extractions of liquid feed into respective multi-effect distillation effects. Additional exemplifications of the method include blending brine that exits a brine flash box with feed liquid fed to a multi-effect distillation effect.

Additional exemplifications of the method include changing at least one of the following parameters to achieve at least one of the results: (a) positions between preheaters at which liquid feed is extracted from the feed routing; (b) the identity of at least one brine flash boxes from which brine is fed to a particular effect among the series of multi-effect distillation effects; (c) sizing of at least one of the routings, brine flash boxes, multi-effect distillation effects, or preheaters; and (d) pressure in at least one of the multi-effect distillation effects or brine flash boxes. In additional exemplifications, the parameter is changed in response to changes in local operating conditions.

A method for producing an improved thermal-based desalination superstructure includes testing or simulating a variety of configurations of routings, preheaters, multi-effect distillation effects, and brine flash boxes; evaluating at least one property selected from (a) performance ratio of distillate production in the superstructure; (b) specific heat transfer area requirements in the superstructure; (c) recovery ratio; and (d) gained output ratio for each configuration; and reiterating the testing or simulating of different configurations to produce a structure in which the property is optimized.

Figure 1:
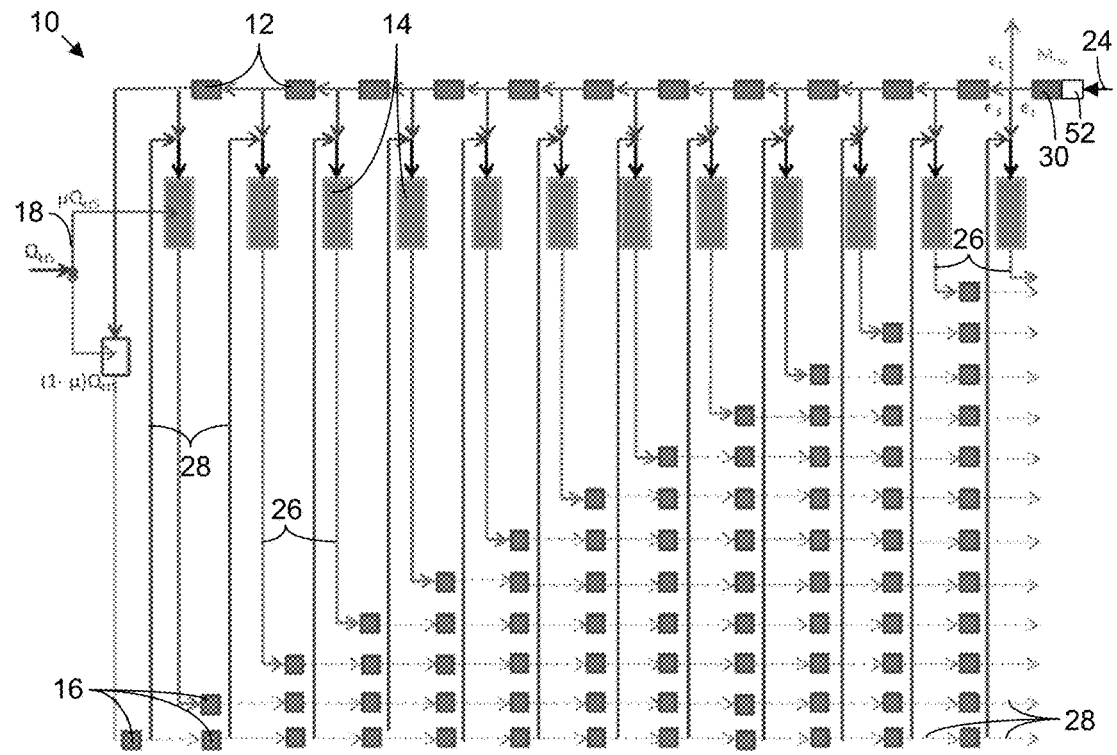
FIG. 1 is a schematic illustration of a superstructure with different brine and feed routings. Without loss of generality, 12 repeating units are shown.

In the accompanying drawings, like reference characters refer to the same or similar parts throughout the different views; and apostrophes are used to differentiate multiple instances of the same or similar items sharing the same reference numeral. The drawings are not necessarily to scale; instead, emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

A methodology is proposed to identify improved thermal-based desalination structures. It is based on the notion of superstructure, allowing for the simultaneous representation of numerous feed, brine and vapor routing schemes. By adjusting the flow routings, the superstructure is capable of representing the common thermal desalination structures, as well as an extremely large number of alternative structures, some of which might exhibit advantageous behavior. The superstructure is built around a repeating unit which is a generalization of an effect in a multi-effect distillation system (MED) and a stage in a multi-stage flash system (MSF).

Multiple-effect distillation (MED) consists of multiple stages or "effects". In each effect, the feed water (e.g., sea water) is heated by steam, typically in tubes. Some of the feed water evaporates, and this steam flows into the tubes of the next stage, heating and evaporating more feed water. Each stage essentially reuses the energy from the previous stage. The tubes can be submerged in the feed water; but, more typically, the feed water is sprayed on the top of a bank of horizontal tubes, and then drips from tube to tube until it is collected at the bottom of the stage. Meanwhile, multi-stage flash distillation (MSF) is a water desalination process that distills feed water by flashing a portion of the feed water into steam in multiple stages of what are essentially countercurrent heat exchangers.

The superstructure is proposed as an improved tool for the structural optimization of thermal desalination systems, whereby the optimal selection of components making up the final system, the optimal routing of the vapors as well as the optimal operating conditions are all variables simultaneously determined during the optimization problem. The proposed methodology is applicable to both stand-alone desalination plants and dual purpose (water and power) plants wherein the heat source to the desalination plant is fixed. It can be extended to also consider hybrid thermal-mechanical desalination structures, as well as dual purpose plants where the interface of power cycle and desalination is also optimized for.

Then, a multi-objective structural optimization of integrated thermal desalination and thermal compression systems is performed, whereby the performance ratio of the structures is maximized while the specific area requirements are minimized. With the aid of the superstructure developed herein, the thermal compression of vapor streams produced in intermediate multi-effect distillation (MED) effects (stages) as opposed to the common practice of compressing vapors produced in the last effect, is examined. The study concludes that intermediate vapor compression results in significant reductions in area requirements, as well as significant increases in maximum distillate production capacities. Moreover, the optimal location of vapor extraction is heavily dependent on the exact distillate production requirement in question. Two novel configuration forms are informed by the optimization. The first is an integrated MED-TVC+MED+MSF system, while the second is an integrated MED-TVC+MSF system.

1 Introduction 1.1 Pressing Need for Desalination

Seeking to contribute improvements to the field of thermal-based desalination, authors have undertaken varying approaches. Several authors, through parametric studies, investigated the influence of numerous variables to gauge their relative importance on performance of MED plants. These variables include the total number of effects, the temperature and salinity of the incoming feed, the temperature of the heating steam, as well as the temperature of the evaporator in the last effect. While such studies occasionally provide useful insights, most of the relationships that arise, e.g., distillate production is heavily dependent on the number of effects, are mostly expected. Moreover, the results of such studies are of limited use to designers, mainly because parametric studies do not consider interaction between the different system variables. The need for optimization is clear.

To optimize thermal desalination plants, authors have resorted to differing objective functions. In certain situations, the objective functions are economic related such as minimizing unit product cost or minimizing specific heat transfer areas. In others, the objectives are tied to the thermodynamics such as maximizing distillate production or exergy efficiency. While single objective functions are frequently resorted to, multi-objective optimizations are generally preferable. The main reason is that single objective optimization does not necessarily yield applicable designs. For instance, if the distillate production is maximized as part of a single objective study, the associated costs are not directly considered. The result is generally an uneconomical unimplementable plant. In contrast, multi-objective optimization studies can consider both efficiency and economic measures, resulting in more realistic designs. Further, multi-objective optimization allows the quantification of the trade-offs between competing criteria.

The works directed to improve thermal desalination have taken numerous fronts. Some authors have considered the stand-alone optimization of thermal-based configurations. While some of these authors optimized operating conditions associated with pre-existing configurations, others proposed alternative schemes, such as the MSF-MED proposed in C. Sommariva, et al., "Innovative configuration for multi stage flash desalination plant," IDA proceedings, San Diego, 1:16 (1999), and S. F. Mussati, et al., "Novel configuration for a multistage flash-mixer desalination system," 42 Ind. Eng. Chem. Res. 4828-4839 (2003), which they subsequently optimized and compared to conventional structures. Other authors meanwhile have examined hybrid thermal-membrane based technologies seeking to make use of the ease of their integration. By suggesting alternative flow routing possibilities, authors propose that the resulting hybridized structures offer significant synergetic benefits. These advantages include, but are not restricted to, the reduction of capital costs through use of common intake and outfall facilities, the potential for reduced pretreatment and an increase in top brine temperature in thermal desalination. Other authors propose integrating thermal desalination configurations with thermal vapor compression systems as an efficient means of increasing total distillate production, reducing cooling water requirements and potentially reducing heat transfer area requirements, all while being characterized by simple operation and maintenance.

While the aforementioned contributions have resulted in more efficient desalination plants with improved economics, one significant drawback impedes even larger improvements. The general practice of fixing both the hardware, i.e., technology choice, such as MED or MSF, involved in a plant, as well as its flowsheet prior to optimization, results in more tractable optimization problems but has obvious shortcomings. It can be easily seen that an alternative optimization approach whereby both the hardware and the flowsheet could be modified during the optimization process is preferable. This is especially true since there is no guarantee that any of the common configurations already proposed in literature is optimal under any conditions. For studies concerning hybrid plants, in particular, the more flexible optimization could yield breakthroughs as there might be significant benefit from deviating from the conventional setups specific to stand-alone structures.

In a methodology for simultaneous optimization of flowsheet and design/operation using the notion of superstructure, the superstructure is composed of a series of units, allowing for vapor formation by two processes. One option is evaporation of brine within an effect and subsequent condensation of the produced vapor in a feed preheater or a subsequent effect; this is in essence an MED stage. An alternative mode of vapor formation involves the flashing of brine entering into a flash box, and condensation in a preheater, or in a subsequent effect; this is similar to the MSF process.

The general need to investigate modifications in hardware and flow patterns has been looked into. Authors generally proceed to propose a series of modifications they envision to be advantageous. They subsequently optimize the resulting arrangements, and compare the results to those exhibited by conventional structures to decide on the merit-worthiness of their ideas. Unfortunately, such a series of steps is time consuming and their success in yielding improved results depend highly on both the author's experience and creativity. This method is further restrictive because the testing of the huge number of combinations of different possible flowsheets and hardware is infeasible.

Note that herein, desalination-only plants are assumed. However, by design, the methodology can be easily extended to a number of alternative applications, including optimizing cogeneration hybrid facilities. This is achievable since the model of the superstructure tool proposed can easily be integrated with the model of a power plant. One way to optimize a dual-purpose plant is to keep the interface between the power cycle and the desalination unit fixed and optimize each on its own. The case study presented in our manuscript is in that way directly applicable. The only element missing would be to optimize the interface, which is in essence the flowrate and temperature of the steam taken from the power cycle (extraction or back-pressure) used as a heat source for the desalination.

2 Superstructure Concept for Optimizing Thermal Desalination Structures

Herein, we propose a flexible methodology that is capable of adjusting the process diagram of thermal desalination configurations. It is based on the concept of a superstructure, with the capability of adjusting the hardware component set, the routing of all of the different flows entering and exiting each of the eventual components making up the system, as well as adjusting the sizing of all of the necessary components. Through this process, all of the existing thermal desalination configurations can be represented, in addition to an extremely large number of alternative configurations, making it ideal for the systematic comparison of alternatives and the generation of new ones. Note that the superstructure is a notion employed in process design that illustrates all of the different hardware and connectivity possibilities to be considered for optimal process design, as described in L. T. Siegler, et al., Systematic methods for Chemical Process Design (1997).

The methodology allows for improved optimization studies involving thermal configurations. Further, it can be easily adjusted to be used in optimization studies of hybrid configurations involving membrane-based technologies and thermal vapor compression systems, considered in the second part of the article. The tool can be modified to investigate co-generation by integrating it with a power plant model. To illustrate the usefulness of the proposed methodology, the results of several multi-objective optimization studies are presented, whereby the performance improvements are quantified, while the optimal flow patterns are shown to deviate from the convention.

3 Description of Conventional Thermal Desalination Processes

The process of constructing a general superstructure to represent thermal desalination structures is greatly facilitated by the fact that both MED and MSF operate on the same fundamental principles. Both processes require an external heat input to drive the initial production of vapor, and an external work input to drive the pumps which are needed to overcome the different pressures losses experienced by the flows.

Figure 12:
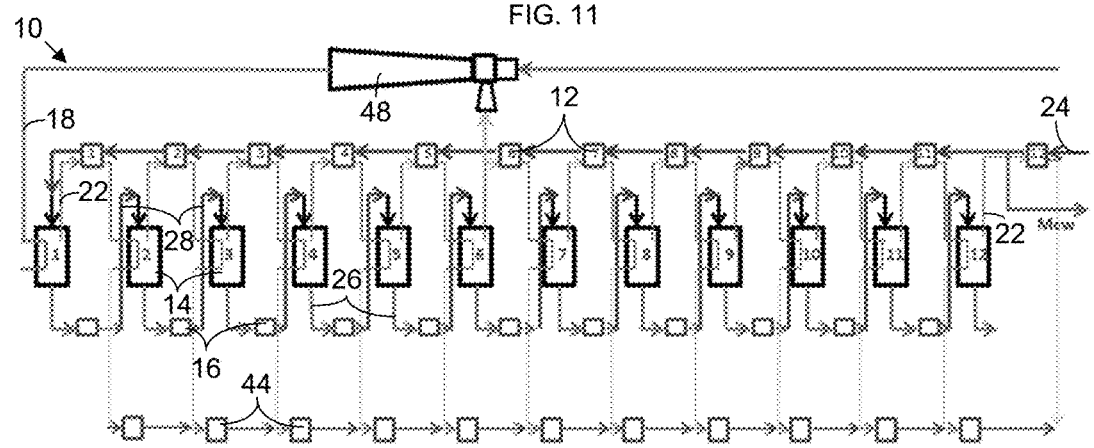
FIG. 12 is a schematic illustration of an example of a FF MED-TVC with vapor extracted from an intermediate (6th) effect. Only a fraction of vapor produced in the 6th unit is directed towards feed pre-heating and vapor production within the next (7th) unit.

As shown in FIGS. 1 and 12, in a MED effect 14, the external heat input is used to first sensibly heat the incoming feed 24 to the first effect 14 and subsequently evaporate a portion of it. The following two separate streams consequently exit the effect 14: a more concentrated brine stream 26, and a saturated vapor stream 22. The saturated vapor 22 is split; a portion of it is used to preheat the feed 24 in a counter-current feed preheater 12 while the remaining portion is used as heating steam to the next effect 14 where additional vapor 22 is generated. To allow for the vapor 22 produced in one effect 14 to heat the contents of the next effect 14 (progressing from left-to-right in the FIGURES), a decreasing pressure profile across consecutive effects 14 (left-to-right) is necessary. A similar procedure is repeated in each of the remaining effects 14 whereby a portion of the vapor 22 generated in the previous effect 14 is used to convert a portion of the feed 24 entering into the effect 14 into vapor 22. Within the last effect 14, all of the generated vapor 22 is directed towards pre-heating the feed 24 in a down condenser. However, since the incoming feed 24 is generally not capable of carrying away all of the heat required to condense the inputted vapor 22 generated in the last stage, additional cooling water is usually entered into the down condenser, where it is pre-heated and subsequently rejected back to the sea. To recover additional energy in the system, intermediate brine and distillate streams are flashed as they are successively entered into lower pressure chambers.

The source of feed 24 to each effect 14 varies depending on the configuration employed. In the forward feed (FF) MED configuration, all of the feed 24 entering into the system is directed solely to the first effect 14. No intermediate feed extractions occur as the feed 24 leaves each consecutive preheater 12, but rather all of the feed 24 leaving a particular preheater 12 is lead into the subsequent one. For all of the remaining effects 14, the feed 24 to the effect 14 comprises brine 26 exiting from the previous effect 14. FF is typically advantageous since the brine 26 leaving the highest temperature effect 14 is the least saline; a characteristic that reduces the risk of scaling. The parallel cross (PC) MED configuration, is an alternative configuration. Within this configuration, the feed 24 to each effect 14 comprises pre-heated seawater extracted at the outlet of the corresponding feed preheater 12. Brine 26 exiting each effect 14 is simply flashed to produce additional vapor 20, without allowing any of the brine 26 to be inserted as feed into any of the subsequent effects 14. Typically the PC-MED configuration is found to be capable of larger distillate production capabilities compared to FF-MED.

MSF largely resembles the MED configuration in its flowsheet with the exception that all of the vapor 20 generated in any particular stage is solely directed towards pre-heating the feed 24 in the next unit. As a consequence, no vapors are generated by evaporation in MSF. Interestingly, MSF can be considered to be a more specific and constrained form of MED including flash boxes 16. The main mode of vapor production in MSF is the process of brine flashing, a process which is possible because of the decreasing pressure profile within consecutive stages. However, some additional vapor does form by flashing condensed distillates. For the same number of repeating units, MSF is characterized by significantly lower recovery ratios (RR), as compared to MED due to the lower thermodynamic efficiency of flashing compared to boiling. MSF, however, has the advantage that since the top operating temperature can reach up to approximately 110° C. compared to approximately 70° C. in MED, which allows for a larger number of stages in MSF as compared to the number of possible effects 14 in MED. The brine 28 leaving the last stage of the MSF can be returned to the sea as brine blow down, a configuration known as once through MSF (MSF-OT). Alternatively, some designers choose to mix a portion of the brine 28 leaving the last stage with the incoming feed 24 to the plant, a configuration known as MSF with brine mixing (MSF-BM).

4 Superstructure Proposed for the Process

The superstructure 10 was constructed with the constraint that all of the resulting process designs can be physically implemented. The finalized superstructure 10 is represented in FIG. 1. Section 4.1 discusses all of the different design options allowed by the process, while Section 4.2 examines how variables can be manipulated to delete different components. Section 4.3 highlights, with the aid of schematics, how the generalized superstructure 10 can be reduced to known configurations. Section 4.4 discusses the main limitations of the current superstructure 10. Sections 4.5 outline details of the mathematical modeling of different components that could potentially make up the final system. Lastly, Sections 4.6 and 4.7 outline the necessary operation constraints, as well as the choice of optimization variables.

4.1 Design Options

Figure 2:
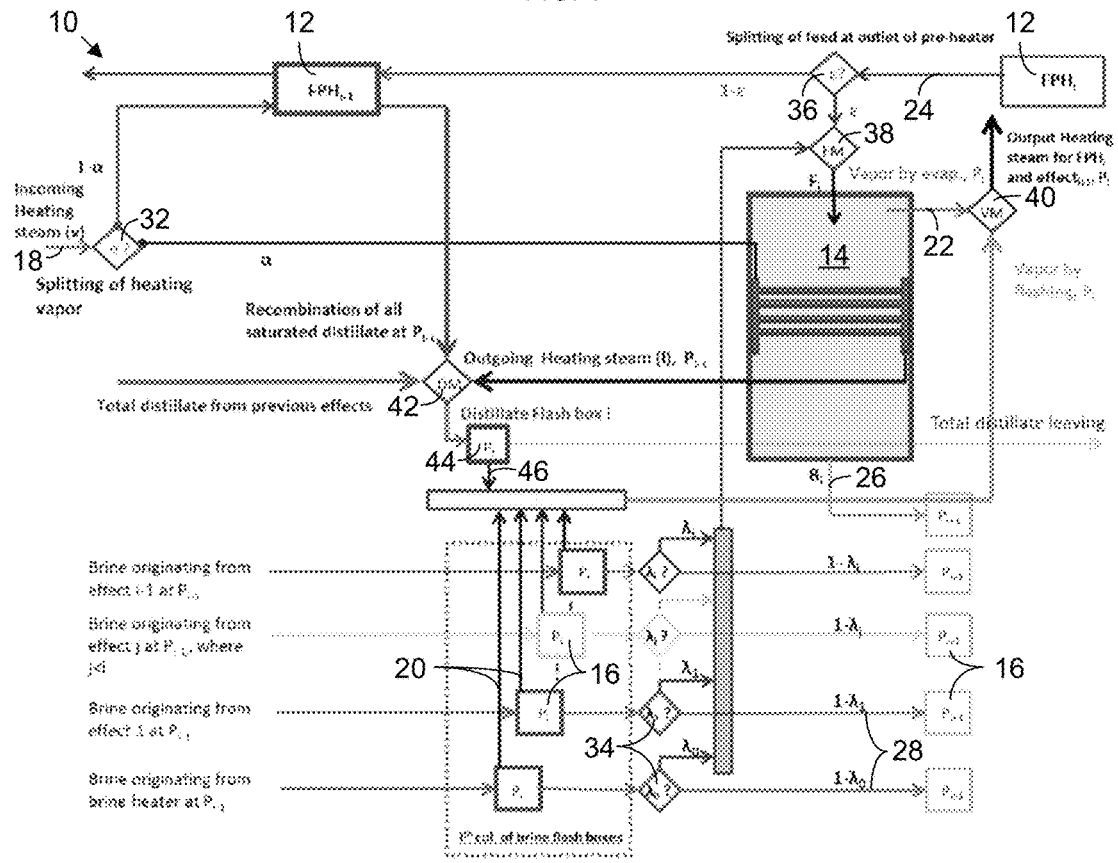
FIG. 2 is a schematic illustration showing the vapor routings of the superstructure of FIG. 1.

Several novel flow patterns are allowed. FIG. 1 provides a schematic illustrating the numerous brine 20 and 22 and feed flow 24 routings in the superstructure 10 proposed. For simplicity, a total of 12 units is chosen. To maintain a non-convoluted figure, the vapor routings barring the input primary heating steam are not shown in FIG. 1. FIG. 2, however, provides the complete schematic including vapor routings for a sample repeating unit, i, in the superstructure 10. A few exemplary design options allowed by the superstructure 10 are also represented in FIG. 2, indicated by the variables, $\alpha$, $\lambda$ and $\varepsilon$.

The superstructure 10 is built around several discrete/continuous choices:

the choice of what fraction of the overall feed flow 24 leaving any intermediate feed preheater 12 (FPH) is extracted to be sent to the corresponding MED effect 14 ($\varepsilon$) and what fraction is directly sent to the next preheater 12 (1-$\varepsilon$); this is a continuous decision where the condition ($\varepsilon$=1) corresponds to complete extraction, while ($\varepsilon$=0) signals that all feed 24 leaving a preheater 12 is inserted to the next preheater 12; any intermediate value corresponds to only a fractional extraction; at the exit of the down-condenser, there is an additional split variable, $\varepsilon_1$, shown in FIG. 1, which dictates what fraction of total feed 24 is returned to the sea (i.e., serves as cooling water); the fractions, $\varepsilon_2$ and $\varepsilon_3$, then dictate the corresponding fractions that are entered into last effect 14 and fed to the last preheater 12 respectively;

the choice of what fraction of the total brine 28 leaving a particular brine flash box 16, is extracted to be fed to the next effect 14 ($\lambda$) and what fraction is allowed to be sent to the next flash box 16 in the same flash box line (1-$\lambda$); this feature allows the model an interesting option of using brine output 26 from any effect 14, i, as feed to any effect 14, j, where j>i;

the choice of what fraction of the available secondary heating steam 18 (comprising vapors produced by brine evaporation, brine flashing, and distillate flashing) is sent to the next effect 14 ($\alpha$) to accomplish brine evaporation, and the choice of what fraction is sent to the corresponding feed preheater 12 to achieve feed pre-heating (1-$\alpha$); in literature, designers often allocate all of the vapor 20 formed by brine flashing towards the end of feed pre-heating, and fix all of the vapors 22 formed within an effect 14 towards the end of heating contents of the next effect 14; by combining all of the formed vapors 20 and 22 and subsequently choosing a value for $\alpha$, some of the vapor 20 formed by brine flashing could be used towards brine evaporation within next effect 14, while some of the vapor formed by evaporation within an effect 14 could be used towards feed pre-heating in the next unit of superstructure 10;

the choice of what fraction of the primary heating steam 18 available is directed towards the first MED effect 14 for evaporation ($\mu$) and what remaining fraction is directed towards the brine heater corresponding to the MSF line (1-$\mu$) is shown in FIG. 1.

For the example of 12 effects 14, optimization of the superstructure 10 ultimately decides on the optimal values for each of the 13 $\varepsilon$'s, 72 $\lambda$'s, 12 $\alpha$'s and 1 $\mu$ variables. In total, these 98 different variables dictate a very large combination of possible hardware components, and combination of possible finalized flowsheets (in excess of 1040 structures).

4.2 Post-Processing to Identify Optimal Hardware

The general superstructure 10, made up of N repeating units, is capable of representing a maximum of N effects 14, N feed preheaters 12, N−1 distillate flash boxes 44 and a maximum of $N^2/2$ different brine flash boxes 16. The superstructure 10 is flexible in adapting which subset of allowable components is ultimately used. One interesting and extremely useful feature of the implementation is that components can be deleted without the need to resort to any integer variables, which is the traditional method of implementing superstructures. Avoiding the use of integer variables greatly minimizes the relative difficulty of system optimization, which the superstructure 10 will eventually be used for.

Assuming the optimization is complete, a thorough post-processing of the value of the different system variables signals whether a component is included. Deletion of an effect 14 is signaled either by the absence of any incoming feed 24 into the effect 14, or alternatively by the absence of any vapor production by evaporation within the effect 14. Deletion of a preheater component 12 is indicated by the absence of any heating vapor being directed towards it (i.e., the corresponding α=1), which is synonymous to an absence of any temperature difference as the flow passes through the device and a sign that no heat transfer occurred. For brine and distillate flash boxes 16 and 44, elimination of the hardware is signaled by the absence of an incoming flow into the component. To the end of determining whether a specific brine or feed flow is negligible, cut-off assumptions are enforced.

Specifically, any flow representing less than 0.2% of the mass flow rate of incoming feed 24 is neglected. The presumption is that the benefit of this marginal flow to the overall system level performance would likely not justify the inclusion of an additional component once a more thorough economic analysis is conducted.

While the superstructure 10 is capable of representing $N^2/2$ different brine flash boxes 16, it can be envisioned that capital costs associated with that many separate components would be tremendously high. Fortunately, the number of brine flash boxes 16 can be manually reduced in the post-processing phase through a recursion. A group of brine flash boxes 16 operating at a common pressure can be combined into one equivalent operating flash box 16 operating at the same pressure if all of their outputs are redirected to the same location to mix. This process is repeated until no two differing brine flash boxes 16 operating at the same pressure feed all of their output into the same location.

4.3 Representation of Conventional Configurations

Figure 7:
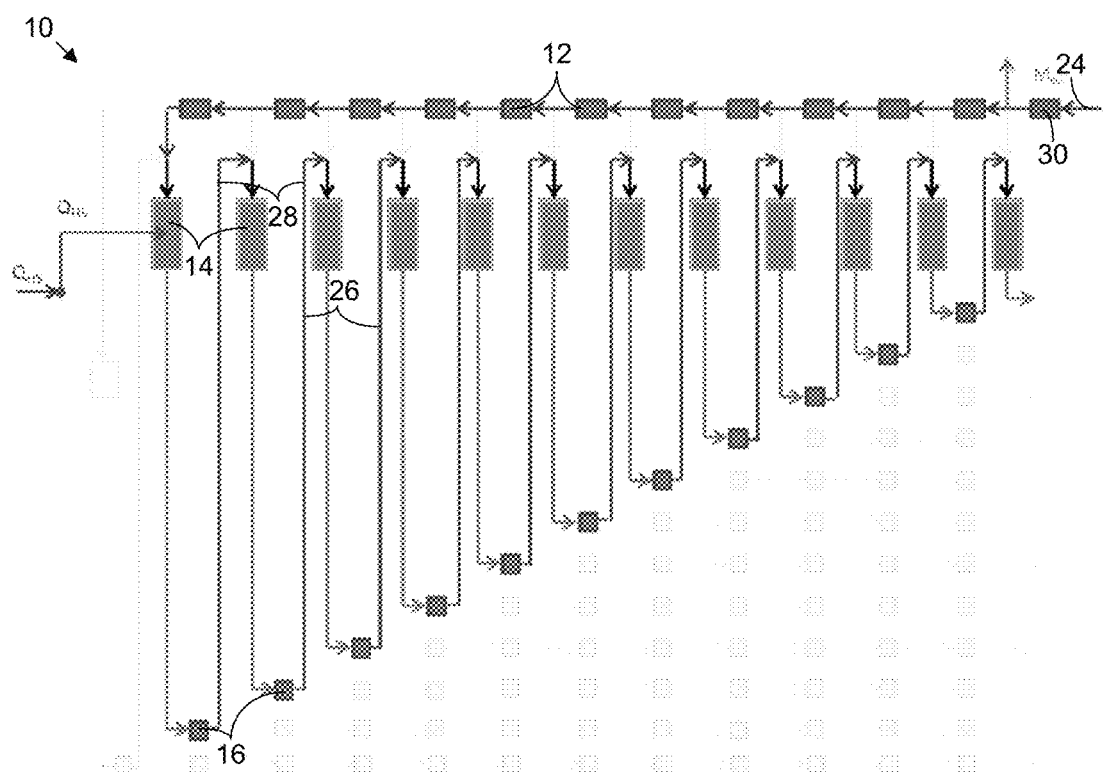
FIG. 7 is a schematic illustration of the brine and feed streams in a 12-effect forward-feed (FF) MED from a simplified superstructure.
Figure 8:
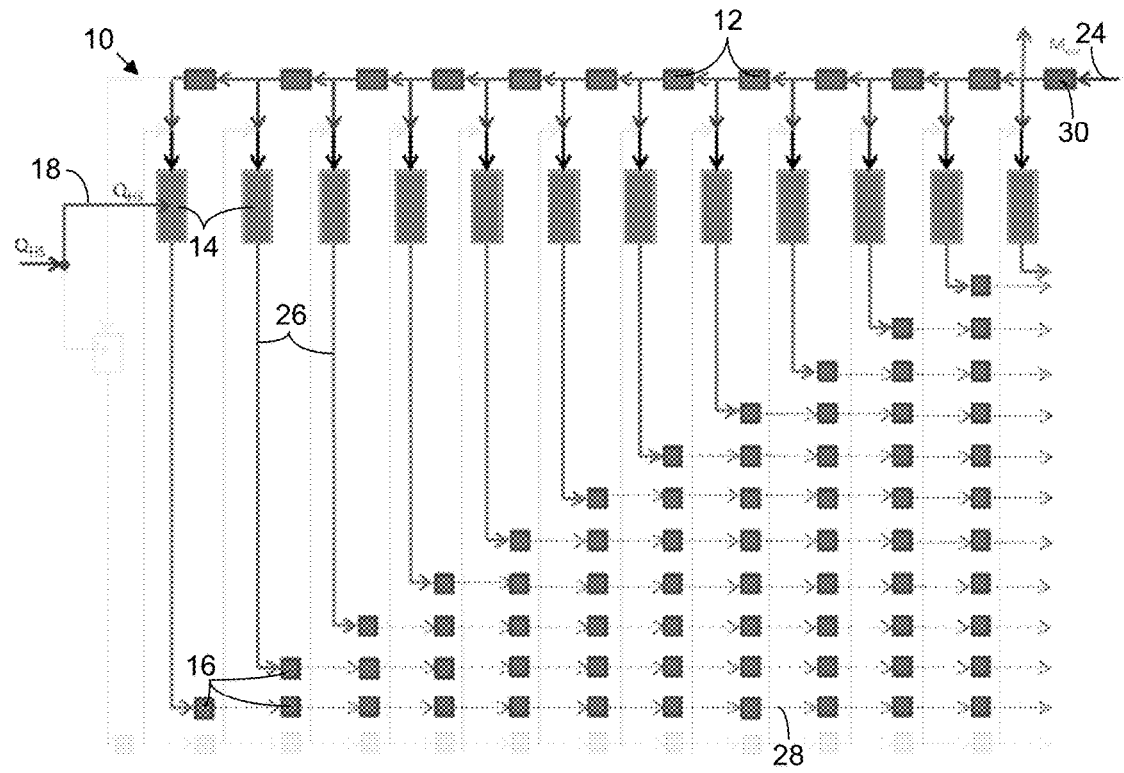
FIG. 8 is a schematic illustration of the brine and feed streams in a 12-effect parallel cross (PC) MED from a simplified superstructure. Brine flash boxes can be recursively removed to simplify to traditional PC MED.
Figure 9:
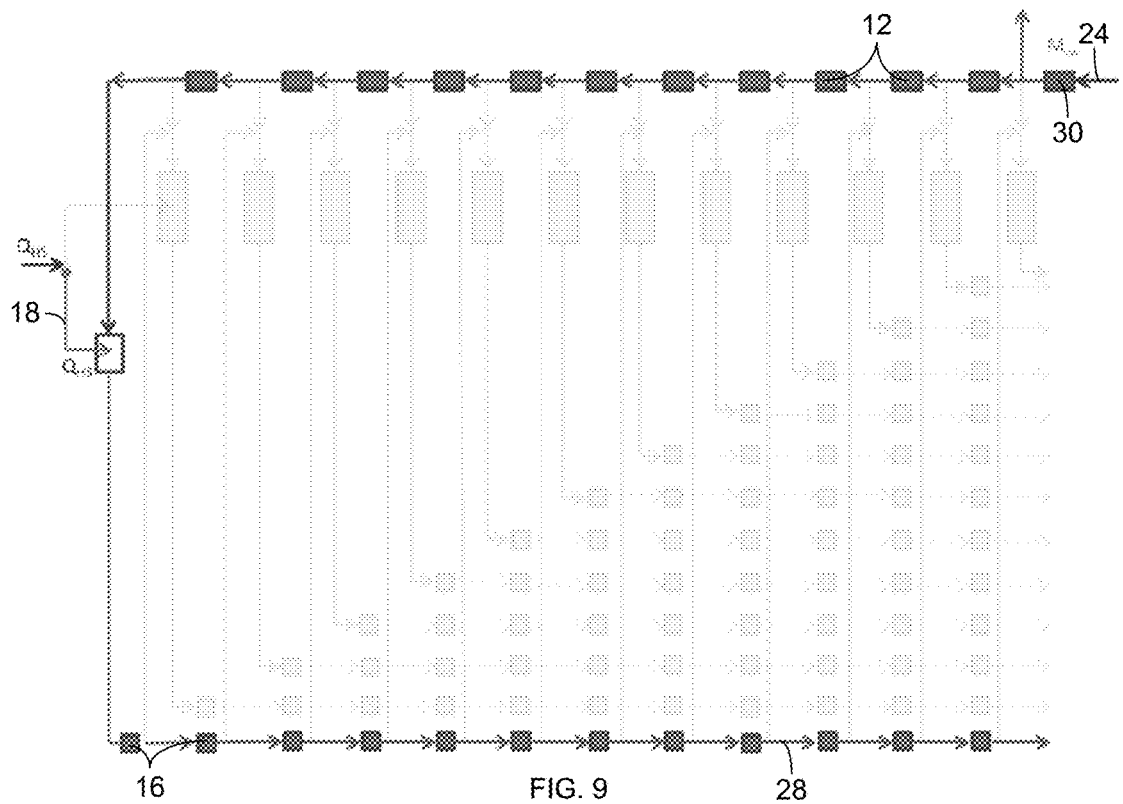
FIG. 9 is a schematic illustration of the brine and feed streams in a 12-stage once-through MSF from a simplified superstructure. Vapor generated in flash boxes is used to preheat the feed.

Through an appropriate choice of extraction variables, the superstructure 10 can represent known structures. For illustrative purposes, the process diagrams for the FF-MED (FIG. 7), the PC-MED (FIG. 8), and the OT-MSF (FIG. 9) are figuratively represented, whereby the transparency of the streams and components signal their exclusion. It is worth highlighting that the intermediary heating steams 18 are not shown in the schematics. The procedure, however, is to combine all of the vapor streams formed by all of the different modes of vapor production to form an overall heating steam 18, which is subsequently split appropriately among the feed preheater 12 and effect 14.

4.4 Limitations of Superstructure

In general, a superstructure 10 represents all of the options that the authors perceive to be potentially advantageous. Herein, the superstructure 10 does not allow the option of the backward feed, which is considered disadvantageous; the process of redirecting brine output 26 from an effect 14 to a higher-pressure prior effect 14. A configuration characterized by backward feed has an increased risk of scaling because the highest temperature effects 14 are also characterized by the highest salinities. Moreover, the brine 26 exiting an effect 14 would be pumped from one effect 14 to the next which would significantly increase pumping requirements.

Within the last effect 14, certain options, such as the recirculation and mixing of part of the brine blow down with incoming feed are not represented. This is a common procedure in MSF configurations. However, since only 12 units of the superstructure 10 are implemented in this work, the dominant structures are expected to take the form of MED structures, where this option is not common. Nevertheless, it would be interesting to investigate whether such an idea has merit in future versions of the superstructure 10.

The mathematical model computes most of the important metrics including the RR (defined as the fraction of the feed converted to distillate), the performance ratio and the specific area requirements.

4.5 Mathematical Representation

A detailed description of the mathematical modeling of the different system components, which include the effects 14; preheaters 12; flash boxes 16 and 44; mixers 38, 40, and 42 and splitters 32, 34, and 36 is provided in the following section. The mathematical modeling is based on mass, species and energy balances around each of the components.

Mathematical Model:

Mixer

Mixers 38, 40, and 42 have one output stream, but multiple input streams. Assuming m different incoming streams, each characterized by an incoming mass flow rate, $N_{in_j}$, the mass flow rate of the outputted stream, $N_{out}$, can be computed according to the following relation:

$$N_{out} = \sum_{j=1}^{m} N_{in_j}. \tag{1}$$

For the mixers 38 and 42 dealing exclusively with liquid streams, the model assumptions of incompressible liquid streams and composition-independent enthalpies allow the energy balance to be simplified to the following:

$$T_{out} = \frac{\sum_{j=1}^{m} N_{in_j} T_{in_j}}{N_{out}}. \tag{2}$$

Moreover, when the compositions of the different inlet streams are not identical, the salinity, X, of the outlet stream can be computed from a species conservation balance as indicated below:

$$X_{out} = \frac{\sum_{j=1}^{m} N_{in_j} X_{in_j}}{N_{out}}. \tag{3}$$

This work enforces that only saturated vapor streams of the same pressure can mix. For this reason, in the case of vapor mixers 40, the outlet stream is assumed to always be at the same temperature as the inlet streams.

Splitter

Splitters 32, 34, and 36 have one incoming stream, which is subsequently divided into two or more streams. Assuming an incoming stream, $N_{in}$, and m differing outgoing streams, $N_{out_j}$, splitters are governed by a general mass conservation equations as described below:

$$N_{in} = \sum_{j=1}^{m} N_{out_j}. \tag{4}$$

Assuming each outgoing stream is composed of a fraction, $\beta_j$, of original flow, any outgoing stream, j, can be expressed by the following relation:

$$N_{out_j} = \beta_j N_{in}, \text{ for } j = 1, 2, \ldots, i. \tag{5}$$

where:

$$\sum_{j=1}^{i} \beta_j = 1. \tag{6}$$

MED Effect

In MED effects 14, the mode of vapor production is brine evaporation, signaled by the superscript, be. In addition to the heat required to evaporate part of the brine 26, heat is also necessary to first sensibly heat the feed 24 entering into an effect 14 to the saturation temperature corresponding to the effect 14. Given a specified amount of heat entering into an effect 14, i ($Q_{eff_i}$), the amount of formed vapor 22 ($V^{be}$) that can be formed is determined according to the energy balance in the following Equation:

$$Q_{eff_i} = F_i c_p (T_{sat_{eff_i}} - T_{feed_i}) + V^{be} L. \tag{7}$$

Brine Flashing Box

In situations where saturated brine, $B_{bfb_{in}}$, is entered into a lower pressure brine flash box 16, the vapor 20 generated by brine flashing ($V^{bf}$) can be found as:

$$V^{bf} = \frac{B_{bfb_{in}} c_p (T_{sat_{in}} - T_{sat_{bfb}})}{L}. \tag{8}$$

Subsequently, the amount of brine 28 output from the flash box 16 ($B_{bfb_{out}}$) and its corresponding salinity ($X_{bfb_{out}}$) are determined by a mass balance (Equation 9) and a salt balance (Equation 10) respectively.

$$B_{bfb_{out}} = B_{bfb_{in}} - V^{bf}; \tag{9}$$

$$X_{bfb_{out}} = \frac{B_{bfb_{in}} X_{bfb_{in}}}{B_{bfb_{out}}}. \tag{10}$$

The subscript, bfb, refers to the brine flash box 16, while the superscript, bf, refers to mode of vapor production, which corresponds to brine flashing.

The brine flash boxes 16 are chosen to operate at a pressure similar to that of the subsequent effect 14. This choice allows for the generated vapors 20 to exit at pressures similar to those of the vapors 22 generated within the effects 14, which allows for their mixing.

Distillate Flashing Box

Additional vapor 46 is generated when saturated distillate at temperature, $T_{sat_{in}}$, is flashed in a lower-pressure flash box 44 operating at $P_{sat_{dfb}}$. This amount is found according to equation 11.

$$V^{df} = \frac{D_{dfb_{in}} c_p (T_{sat_{in}} - T_{sat_{dfb}})}{L}. \tag{11}$$

The subscript, dfb, refers to a distillate flash box component, while the superscript, df, refers to distillate flashing.

Preheater

In any particular feed preheater 12 (FPH), a certain portion of heating steam 18 condenses to provide the heat required to pre-heat the incoming feed 24. Assuming a specified amount of heat transfer, $Q_{FPH_i}$ is transferred to the incoming feed flow 24, the temperature of the feed 24 at the outlet of the preheater 12 can be determined according to Equation 12, below:

$$Q_{FPH_i} = F_{FPH_i} c_p (T_{FPH_{out}} - T_{FPH_{in}}). \tag{12}$$

Main Brine Heater

Essentially also a feed preheater 12, the function of the main brine heater 30 (MBH) function is to sufficiently heat the incoming feed 24 such that the temperature of the outgoing feed 24 exceeds the saturation temperature corresponding to the brine flash box 16 into which the stream will be entered so as to induce brine flashing, the main mode of production within MSF configurations.

Assuming a total heat transfer of $Q_{MBH}$ is transferred to the main brine heater 30, the temperature at the outlet of the device is determined according the energy balance in Equation 13:

$$Q_{MBH} = (F_{MBH})(C_p)(T_{MBH_{out}} - T_{MBH_{in}}). \tag{13}$$

Down Condenser

The down condenser, dc, is responsible for condensing the vapors generated in the last unit of the structure. This heat is carried away by seawater flowing through the down condenser, $F_{dc}$, which is composed of both cooling water and total feed to the rest of the thermal system. As such, the amount of heat transfer can be expressed as:

$$Q_{dc} = HS_N L = F_{dc} c_p (T_{dc_{out}} - T_{sw}). \tag{14}$$

Heat Transfer:

The following section describes how the heat transfer requirements within the effects 14 and preheater 12 are determined, while the subsequent section outlines the main assumptions utilized in this model. Note that the model assumptions correspond essentially to standard models in literature. Such a model is adequate for the aim of establishing a methodology for structural optimization and identification of interesting potential structures. Substantially improving the model accuracy would result in a significantly more complicated model; this would change little in our methodology but present an optimization problem that is most likely intractable with state-of-the-art optimizers.

Heat Transfer Design Equations:

Design equations to compute the required heat transfer areas within the effects 14, the preheaters 12, the down-condenser and the brine heater 30 are developed in this section. The heat exchanger areas are assumed to be just large enough to condense the heating vapor incoming into the component.

Within the effects 14, the required heat transfer area, $A_{eff}$, is dependent on the overall heat transfer coefficient, $U_{eff}$ (herein, not accounting for fouling) and the thermal temperature gradient and is computed as follows:

$$A_{eff_i} = \frac{Q_{eff_i}}{U_{eff_i} \Delta T_{eff_i}}. \tag{15}$$

The thermal gradient, $\Delta T_{eff}$, within an effect 14 is described by the following equation:

$$\Delta T_{eff_i} = Tv_{i-1} - T_{eff_i}. \tag{16}$$

The following relation gives the heat transfer area in the preheaters 12:

$$A_{FPH_i} = \frac{Q_{FPH_i}}{U_{FPH_i} LMTD_{FPH_i}}, \tag{17}$$

where the log mean temperature difference in a preheater 12, $LMTD_{FPH}$, is calculated as follows:

$$LMTD_{FPH_i} = \tag{18}$$

$$\frac{(Tv_i - T_{FPH_{i_{out}}}) - (Tv_i - T_{FPH_{i_{in}}})}{\mathrm{Ln}\frac{(Tv_i - T_{FPH_{i_{out}}})}{(Tv_i - T_{FPH_{i_{in}}})}} = \frac{(T_{FPH_{i_{in}}} - T_{FPH_{i_{out}}})}{\mathrm{Ln}\frac{(Tv_i - T_{FPH_{i_{out}}})}{(Tv_i - T_{FPH_{i_{in}}})}}.$$

Similarly, the area requirements within the down-condenser can be computed as follows:

$$A_{dc} = \frac{Q_{dc}}{U_{dc} LMTD_{dc}}. \tag{19}$$

where $$LMTD_{dc} = \frac{(T_{dc_{out}} - T_{sw})}{\mathrm{Ln}\frac{(T_{v_N} - T_{sw})}{(T_{v_N} - T_{dc_{out}})}}. \tag{20}$$

In the main brine heater 30, the area requirements are determined as follows:

$$A_{MBH} = \frac{Q_{MBH}}{U_{MBH} LMTD_{MBH}}, \tag{21}$$

where LMTD across the main brine heater 30 is found as a function of the temperature of input heating steam 18, $THS_0$, as follows:

$$LMTD_{MBH} = \frac{(T_{MBH_{out}} - T_{in})}{\mathrm{Ln}\frac{(T_{HS_0} - T_{MBH_{in}})}{(T_{HS_0} - T_{MBH_{out}})}}. \tag{22}$$

Model Assumptions:
Thermodynamic Assumptions

Given the narrow temperature range within which thermal desalination plants operate, several engineering approximations are justified. First, all liquid streams are considered incompressible. Moreover, a representative value of 4 kJ/kgK is assumed for the seawater specific heat at constant pressure, $c_p$, which is assumed to be independent of temperature and salinity. Similarly, a constant enthalpy of evaporation of 2333 kJ/kg is assumed. Non-equilibrium allowance is assumed negligible, while the boiling point elevation, BPE, which determines the variation in the saturation temperature of the brine and formed vapors due to their differing compositions, is computed according to accurate correlations developed by M. Sharqawy, et al., "Thermophysical properties of seawater: A review of existing correlations and data," 16 Desalination and Water Treatment 354-380 (2010).

These correlations are assumed to be dependent on both the composition and temperature of the saturated brine.

Further Engineering Assumptions:

Several standard assumptions were used to derive the mathematical model. These include:
 steady state operation;
 negligible heat losses to the environment;
 negligible pressure drops across the demister, the connecting lines and during condensation;
 salt-free distillate (i.e., zero salinity);
 negligible effect of non-condensable gases on system operation;
 temperature-dependent overall heat transfer coefficients in both the effects 14 and the preheaters 12 computed according to H. El-Dessouky, et al., "Steady-state analysis of the multiple effect evaporation desalination process," 21 Chemical Engineering & Technology 437-451 (1998);
 to minimize the risk of scaling, the top brine temperature within effects 14 is upper bounded at 70° C.; and
 while the maximum allowable salinity is upper bounded at 72000 ppm.

The mathematical model provides the general equations defining how mixers and splitters 32, 34, and 36 operate. It is clear, however, by inspecting FIGS. 1 and 2, that numerous mixers and splitters 32, 34, and 36 occur within the overall system. Three different instances of mixing occur within any particular superstructure unit, indicated in FIG. 2. A feed mixer allows the formation of the total feed to an effect 14 by allowing the blending of several brine streams 28 extracted from the appropriate flash boxes 16 with extracted feed exiting from a preheater 12. A vapor mixer combines all generated vapor streams 20, 22, and 46 produced in a particular unit to form the overall heating to the next unit of the superstructure 10. Finally, a distillate mixer merges the condensed heating steam with the combined distillate produced in prior units. The distillate output from the distillate mixer is fed into an appropriately pressured distillate flash box 44, where it flashes.

Splitters 32, 34, and 36, on the other hand, can be seen to occur at multiple system locations that include the outlet of the down condenser, the outlet of each of the preheaters 12 as well as the outlet of each of the brine flash boxes 16. An additional splitter 32 divides the input heating steam 18 so that a fraction of it can be directed to heat contents of the first effect 14, while the remainder is directed to the brine heater. Additional splitters occur at the outlet of the each of the vapor mixers to segregate the vapor to be used for feed pre-heating from the vapor to be used for evaporation within the appropriate effect 14.

4.6 Operational Constraints

To ensure the feasibility of the finalized structure, several temperature constraints are enforced. The constraints include:
 saturation temperature of the brine decreases with effect number;

the temperature of the heating steam 18 exceeds the temperature of the feed 24 it is used to heat at both the outlet and inlet of each preheater 12;

the saturation temperature of the heating steam 18 is greater than the saturation temperature of the brine within the effect 14 it is designated to heat;

the temperature of the feed 24 exiting a preheater 12 is not less than the temperature of the feed 24 entering a preheater 12;

the temperature of the cooling water leaving the down condenser does not exceed the temperature of the vapor 22 generated in the last effect 14.

Although it is customary to set minimum pinches in heat exchangers, this work avoids doing so. Since one of the objective functions includes an economic related metric, the optimizer will itself seek a solution where sufficiently large temperature differences between the heating and heated medium are made available.

4.7 Optimization Variables

In all subsequent optimization studies performed using the superstructure 10, the optimization variables include a subset of the variables to be discussed herein. The first set of optimization variables are the split ratios discussed in Section 4.1, which are considered to be continuous, with possible values ranging from 0 to 1. The other potential optimization variables are the overall feed flow rate to system, the saturation temperature within each of the effects 14, as well as the temperature profile of the feed 24 at the inlet and outlet of each of the preheaters 12. A setup where all of the aforementioned variables are not preset in any way prior to the optimization will from hereupon be referred to as unconstrained superstructure optimization.

Once the value of all of the optimization variables are determined, simple mass and energy balances can be used to determine the flow rates and concentrations of all of the brine, feed, and distillate streams within the system. The different thermodynamic losses and overall heat transfer coefficients can then computed, which allow the determination of the required sizing of each of the system components.

While optimization of the unconstrained superstructure 10 is always expected to yield the best results, the superstructure 10 can be used in alternative investigations where some of the optimization variables are input into the problem as fixed parameters. For instance, to identify the optimal operation conditions associated with a conventional PC-MED or FF-MED configuration, all of the split ratios are specified as parameters to the optimization problem. Further uses of the superstructure 10 will be illustrated in several case studies presented in Section 5.

5 Case Studies Involving Stand-Alone Thermal Structures

This section intends to highlight the wide capabilities of the superstructure 10 through three illustrative case studies. All of the case studies considered herein deal with optimization of standalone thermal configurations.

The main intention of the first case study is to illustrate how optimization of the superstructure 10 yields significantly improved configurations relative to the conventional thermal configuration restricted by conventional design specifications. Further, the study shows that even if the choice of plant is restricted to one of the conventional designs, the optimal design is heavily dependent on many factors including distillate production requirements.

The second case study, presented in Section 5.4, examines the effect 14 of the temperature and salinity of the incoming feed-water on the resulting optimal structures. The study exhibits the power of the superstructure 10 to quickly identify both the optimal flowsheet and the optimal operational conditions under varying local seawater conditions.

Finally, the third case study shows how the effect 14 of certain parameters (e.g., RR) on plant performance could be systematically investigated through a repeated process of varying the value of the parameter in question and repeating the superstructure optimization. Since the superstructure 10 allows the varying of both the hardware and flow patterns between different runs, this study allows designers to better gauge the impact of the parameter in question compared to traditional parametric and optimization studies.

An overview of the problem definition, which includes the objective functions used as well as the mode of optimization, is presented in Section 5.1. The software utilized in this work, coupled with the solution methodology are outlined in Section 5.2.

5.1 Problem Definition

The optimization problem considered herein is to determine both the optimal structure and the optimal operating conditions required to produce freshwater at the lowest possible cost. A multi-objective optimization is performed in the three case studies. Specifically, two different objective functions are chosen, one to represent the thermodynamic efficiency and the other to represent the economic costs. Maximizing thermodynamic efficiency is accomplished by maximizing the distillate production on a per unit of heating steam basis, a parameter known as the performance ratio (PR); note that here PR is defined as the mass ratio to stay dimensionless; in industry other units are used as well. Maximizing PR can also be thought of in terms of reducing operating costs of the plant, since less heating steam 18 would be required to achieve fixed freshwater production requirements.

Minimization of costs is attained through the minimization of the specific heat transfer area requirements (SA) within the system. This is chosen as the preferred metric corresponding to capital costs. Although more detailed cost metrics could have been utilized, these are usually strongly dependent on prices, which vary with geographical location and with time. It is useful to note that the methodology can be easily adapted to different relevant metrics. However, this might potentially result in optimization problems which are harder to solve. If, in particular, the presence of units is penalized, most likely integer variables would need to be introduced.

The aforementioned multi-objective optimization problem is solved by reducing the problem to a series of single-objective optimization problems. In each step, the PR is set prior to optimization. The optimization problem is reduced to finding the minimum SA required to satisfy the distillate production requirements. This same process is repeated for a series of different PRs. Ultimately, a Pareto frontier is formed that relates the minimum SA requirements for each PR for a wide span of different PRs. Each individual optimization represents a single data point on the Pareto frontier. Note that the approach followed together with the deterministic global optimizers used guarantees the global solution of the optimization problems and thus the Pareto frontier; this cannot be guaranteed using stochastic algorithms, such as evolutionary multi-objective optimizers.

5.2 Software and Solution Methodology

The superstructure 10 was initially implemented using the JACOBIAN modeling and optimization software (from Numerica Technology). JACOBIAN software is advantageous since it employs a simultaneous equation solver, which facilitates modeling by allowing the model equations to be inserted in whatever order is most intuitive, without the designer having to worry about the development of cumbersome algorithms to reach solution convergence. The only condition is that the final set of equations is fully determined. The solver then identifies the equations and groups them into fully determined blocks, which are subsequently solved iteratively to convergence.

The verified JACOBIAN model was then converted (using an in-house script) to an equivalent model implemented in General Algebraic Modeling System (GAMS), a system suited for numerical optimization. GAMS was chosen since it is tailored for the optimization of complex, large-scale models and allows for the interface with numerous high-performance solvers. To globally solve the non-linear problem of this study, the Branch-And-Reduce Optimization Navigator (BARON) was used, as described in M. Tawarmalami, et al., "A polyhedral branch-and-cut approach to global optimization," 103 Mathematical Programming 225-249 (2005), and N. Sahinidis, "BARON: A general purpose global optimization software package," 8 Journal of Global Optimization 201-205 (1996).

To facilitate model convergence, the generalized reduced gradient algorithm, CONOPT, is used as a local solver to quickly find an initial feasible solution within a few iterations, as described in A. Drud, "CONOPT—A CRG code for large sparse dynamic nonlinear optimization problems," 31 Mathematical Programming 153-191 (1985), and A. Drud, "CONOPT—A large-scale CRG code," 6 ORSA Journal on Computing 207-216 (1992). Theoretically, finding a global solution should be independent of the initial guesses. Practically speaking, however, it is found that faster and more probable convergence is attained when good initial guesses are provided. In addition to good initial guesses, it is especially important to have tight lower and upper bounds for each of the system variables; this helps significantly reduce the feasible space the optimizer has to navigate. Finally, to achieve a robust model, the model is well scaled, with expected values for variables of around 1 (e.g., from 0.01-100). For instance, variables, such as seawater salinity are preferably expressed as 4 g/kg, as opposed to 40000 ppm which is often done in literature. Good initial guesses, sufficiently tight bounds of the variables as well as appropriate scaling are all ensured.

The model solution is difficult since the mathematical model involves many variables (more than 1200 variables) and many constraints (1150 equations and inequalities). Attainment of good initial guesses for the final optimization model, the step necessary for an efficient solution procedure, was performed in a sequence of steps. The first GAMS optimization is run with zero degrees of freedom, which in essence is the equivalent of running a simulation. The attained variable values, which are stored in an output file generated by GAMS, become the initial guesses for the subsequent optimization. Instead of allowing the system all of the proposed degrees of freedom at once, which results in very high CPU requirements, the additional degrees of freedom are allowed to the system sequentially, whereby several equations are relaxed at a time. Each time additional degrees of freedom are made available to the system, the optimization is rerun using CONOPT, where the generated output file serves as the initial guesses for the next optimization run where more equations are relaxed. Once good initial guesses are determined, the final optimization is run using the global deterministic NLP solver BARON.

5.3 Case Study 1: Testing Different Design Specifications

In the literature, there are contradicting claims for the optimal thermal structure motivated by different design criteria. Proponents of the FF-MED arrangement have suggested alternative schemes. Some authors suggest that equal heat transfer areas in each of the effects 14 is preferable, as in H. T. El-Dessouky, et al., Fundamentals of Salt Water Desalination (2002), and H. T. El-Dessouky, et al, "Computer simulation of the horizontal falling film desalination plant," 55 Desalination 119 (1985). This specification is projected to result in cost savings associated with buying identical units. Others have suggested a FF-MED scheme characterized by an equal drop in brine saturation temperature between effects 14, as in H. El-Dessouky, et al., "Steady-state analysis of the multiple effect evaporation desalination process," 21 Chemical Engineering & Technology 437-451 (1998), so as to minimize the area requirements. Proponents of the PC-MED arrangement propose different preferable conditions. These include fixing the concentration of the brine 26 exiting each effect 14 to the maximum allowable concentration; an arrangement intended to maximize overall distillate production through maximizing RR within each effect 14, as in G. M. Zak, et al., "Hybrid thermal—thermal desalination structures." Desalination 1-15 (2012). Others specify near equal feed to each effect, as in F. Mandani, et al., "Performance of parallel feed multiple effect evaporation system for seawater desalination," 20 Applied Thermal Engineering 1679-1706 (2000).

While each of the configurations has perceived advantages, this study compares the usefulness of each of the design criteria by comparing the performance of the optimal structure that satisfies the design requirements to the optimal structure attained by optimizing the superstructure 10 with all its degrees of freedom. In each case, the design criteria are enforced by additional equations over and above the ones representing the model of the most general superstructure 10.

To ensure fair comparison among structures, the RR that all structures must satisfy is set. Since the feed 24 entering into the effects 14 must be pre-treated, setting a common RR ensures comparable pretreatment and pumping costs on a per unit of distillate basis. The optimization problem is then run according to the described methods in Sections 5.1 and 5.2. Table 1 shows the comparison of the results attained under different specifications.

TABLE 1

Comparison of minimum SA requirements (m$^2$/(kg/s)) for different design specifications for PR = 10, 10.5, 11 and 11.25 for T$_{sw}$ = 25° C., salinity = 4.2 g/kg, RR = 0.41.

| Design Specification | PR = 10 | PR = 10.5 | PR = 11 | PR = 11.25 |
| --- | --- | --- | --- | --- |
| Unconstrained superstructure | 389.2 | 403.0 | 427.4 | 469.4 |
| General FF - MED | 389.8 | 408.5 | 468.0 | 569.4 |
| FF - MED with equal area within effects | 395.4 | 408.9 | 469.1 | 582.5 |
| FF - MED with equal temp. diff. between effects | 392.1 | 410.6 | 468.6 | 583.4 |
| PC - MED with near equal feed in all effects | 431.4 | 418.9 | 438.7 | 485.8 |
| PC - MED with max. brine salinity at effect exit | 418.2 | 421.7 | 441.8 | 488.5 |

The results, as indicated in Table 1, confirm that for any particular distillate product requirement, the configuration arising from the superstructure optimization requires lower SA requirements than the optimal configuration arising from any of the proposed design specifications, which is expected given the additional degrees of freedom available to the unconstrained optimization, but nevertheless confirms that none of the already proposed structures are already optimal.

Table 1 indicates that the optimal general FF-MED (i.e., one without imposed constraints regarding equal areas or equal temperature differences) is a desirable structure for low distillate production requirements (PR=10 and PR=10.5) since the SA requirements closely match those required by optimal structures arising from the unconstrained optimization. At higher distillate production requirements (PR=11, and PR=11.25), however, implementation of the FF-MED is not encouraged since the SA requirements exceed those of the superstructure 10 by up to 21 percent. Table 1 further suggests that it is advantageous to revise traditional design specifications, such as imposing equal areas and equal temperature differences, which are shown to require slightly larger SA requirements (2 percent higher for PR=11.25) than the general FF-MED configuration. Although equal areas within the effects 14 may be more practical from an implementation standpoint, this practicality comes at the expense of extra area requirements; a trade-off that must be looked into in more depth by designers.

Table 1 indicates that the PC-MED with near equal feed 24 entering into each effect 14 is optimal. The near equal feed 24 constraint is imposed by dictating that none of the 12 effects 14 receives less than $\frac{1}{15}$th of the total feed 24 entering into the configuration. Still, results suggest that alternative structures motivated by the superstructure 10 require significantly lower SA requirements at high PR requirements (3.5 percent reduction in SA requirements for PR=11.5).

5.4 Case Study 2: Identifying Optimal Structures Depending on Location

Desalination plants extract seawater from varying bodies of water including the Mediterranean, the Red Sea and the Arabian Gulf, each of which is characterized by a different temperature and concentration. While experience in one area of the world could provide invaluable lessons applicable in other regions, the need to optimize configurations taking into account local conditions is irreplaceable. This case study identifies the optimal structure depending on the origin of seawater extraction for different PR requirements. For the sake of this study, constant nominal conditions are assumed. Typically however, these conditions vary throughout the year, and ideally it would be best to optimize the structure taking into account the year round varying conditions. The superstructure 10 in this case study is ensured to satisfy the form of a 12-effect MED, by adjusting the lower bounds of vapor 22 production within each of the effects 14 to an appropriate positive value.

TABLE 2

Comparison of minimum SA requirements (m²/(kg/s)) for different locations of seawater extractions; RR = 0.38, $THS_{input}$ = 70° C.

| $T_{sw}, X_{sw}$ | Standard 20° C., 3.5 g/kg | Mediterranean 26° C., 3.8 g/kg | Red Sea 28° C., 4.1 g/kg | Arabian Gulf 26° C., 4.5 g/kg |
|---|---|---|---|---|
| PR = 10 | 359.2 | 388.3 | 413.6 | 403.8 |
| PR = 10.5 | 371.0 | 402.3 | 428.2 | 418.7 |
| PR = 11 | 392.8 | 429.0 | 457.6 | 453.4 |
| PR = 11.25 | 422.4 | 467.6 | 501.1 | 515.0 |
| PR = 11.5 | 590.6 | 667.8 | 758.2 | 963.5 |

Results of this study, indicated in Table 5.4, suggest that for 12-effect MED structures, feed streams characterized by lower temperatures and concentrations require lower SA requirements. This may seem counter-intuitive since most MED plants are installed in Saudi Arabia and the United Arab Emirates, countries that are mostly in contact with the Arabian Gulf. Moreover, countries with the seemingly favorable standard conditions have not exhibited significant installed MED capacities in recent times. Ultimately, however, the likelihood of implementation of a structure is a heavily influenced by the local fuel costs which are low in the Middle East, and the relative competitiveness of RO, a technology characterized by deteriorated performance at elevated salinity values. It is confirmed that the optimal configurations differ in the proposed flowsheet depending on the environmental conditions.

5.5 Case Study 3: Investigating Influence of RR

For a fixed distillate production requirement, a higher recovery ratio (RR) results in lower overall flow of feed to the plant; and consequently both lower pretreatment costs and lower pumping requirements. Generally, whenever the maximum distillate production is desirable, the RR is maximized by designers insofar as scaling can be avoided. However, while increasing RR might increase distillate production, it has the disadvantages of increasing SA requirements by increasing boiling point elevation losses. This study seeks to quantify the reduction in SA requirements (reducing capital costs) attained by reducing the RR constraint (increasing operating costs).

Figure 3:
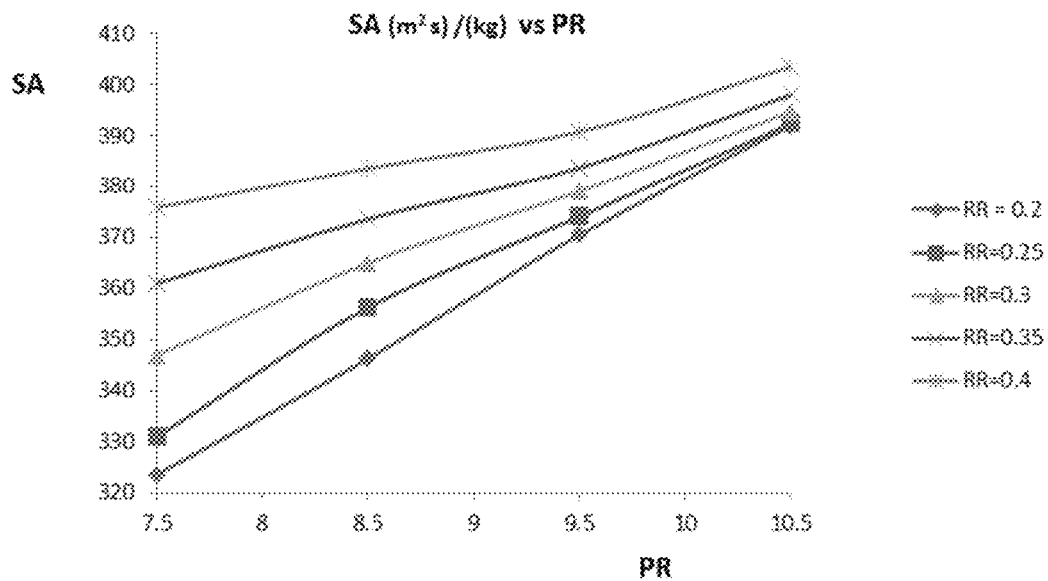
FIG. 3 is a chart providing a comparison of minimum SA requirements [expressed in $m^2/(kg/s)$] for different recovery ratios for four distillate production amounts.

FIG. 3 shows the results attained through this analysis for four differing PR requirements. It can be clearly seen that for a fixed PR, allowing for a decrease in the required RR can result in significant decreases in SA requirements. This observation suggests that the ensuing reduction in capital costs might justify the additional operating costs the operators must tolerate. Ultimately, designers can weigh differing factors, such as the cost of pre-treating the incoming feed (dependent on feed concentration) and the cost of different heat transfer areas, before deciding which combination of optimal PR, SA, and RR is preferable.

5.6 Examples of Optimal Structures

Figure 4:
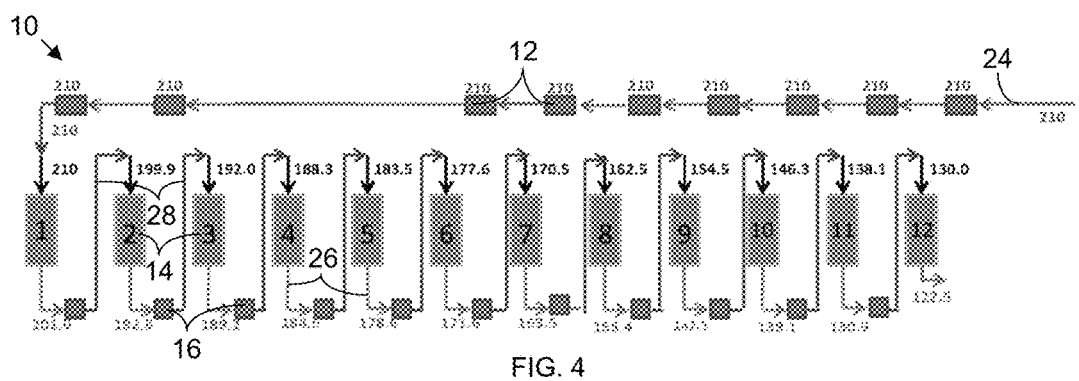
FIG. 4 is a schematic illustration of a desalination structure for PR=7.5.

While Section 5 illustrates that some non-conventional structures exhibit improved performance, this section presents the flow diagrams for some of the prevalent optimal structures. The optimal structures for PR=8.75 (FIG. 4), PR=10.25 (FIG. 5), and PR=11 (FIG. 6), under the assumption of RR=40%, are all shown. The figures depict the optimal flow rates of all of the different brine and feed streams, under the assumption of a 10 kg/s flow rate of input heating steam 18 (not shown in the figure). Note that the absence of a particular preheater 12 signals that all of the vapor produced in the previous superstructure unit is sent in whole to the next effect 14.

It can be seen that the presented structures are indeed non-standard, and do not follow any particular pattern with respect to how flows are directed. For this reason, it is difficult to clearly categorize these structures, although some of the structures do exhibit FF-MED and PC-MED like characteristics.

Figure 5:
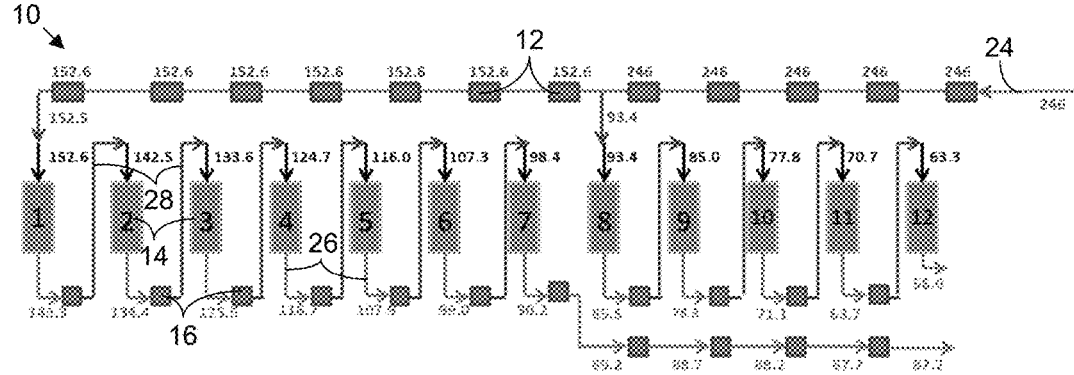
FIG. 5 is a schematic illustration of a desalination structure for PR=10.25.
Figure 6:
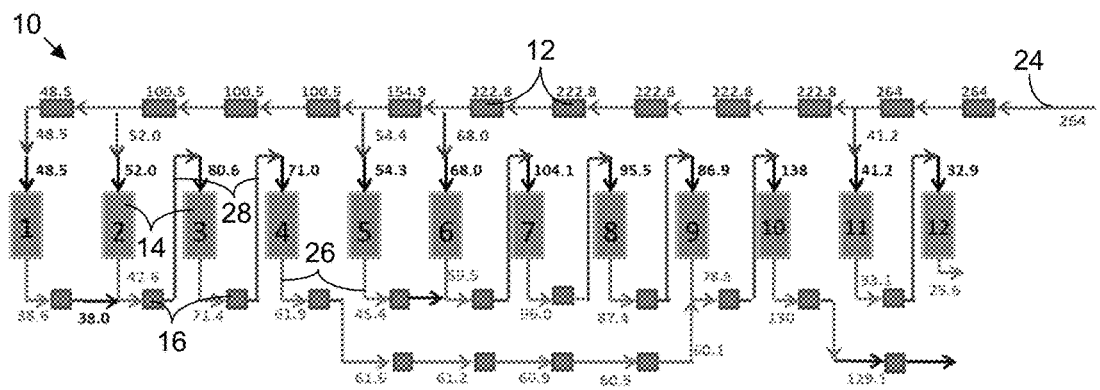
FIG. 6 is a schematic illustration of a desalination structure for PR=11.

For instance, the optimal PR=8.75 structure is similar to the FF-MED in the sense that no intermediate extractions occur. Moreover, all of the brine 26 output from the effects 14 is completely redirected to the next effect 14. The optimal PR=10.25 structure is interesting in that it resembles two FF-MED configurations connected in series. More precisely, the configuration is made up of a 7-effect FF-MED structure connected to a 5-effect FF-MED. The feed 24 entering the 7-effect FF-MED is pre-heated by the preheaters 12 corresponding to the 5-effect FF-MED. Moreover, as indicated by FIG. 5, the concentrated brine 26 leaving the 7th effect 14 is not inserted into any of subsequent effects 14, but rather flashed in a series of flash boxes 16 to recover further energy from the brine 26. This action allows the 5-effect FF-MED to maintain lower outlet salinity brine 26 at exit of its effects 14, which subsequently reduce boiling point elevation losses and thus reduce area requirements.

Compared to the lower PR structures, the optimal PR=11 structure allows more frequent intermediate feed extractions from the main feed pre-heating line. The result is a lower amount of feed 24 entering into the initial effects 14. The resulting reduction in sensible heating requirements allows for more vapor 22 generation in the early effects 14, which ultimately increases the total distillate that can be formed in the structure. It is worth noting the unconventional brine routing in the structure. For instance, the brine 26 output in the 4th effect 14, for instance, is fed into the 10th effect 14, while the brine 26 output from the 10th effect is allowed to by-pass all of the later effects 14.

A cursory look at the structure shows that optimization must be employed to obtain thermoeconomically favorable structures. For instance, a designer with the knowledge of the optimal structures corresponding to PR=8.75 and PR=10.25 would still not be able to accurately predict the optimal flowsheet for a structure corresponding to PR=9.5.

6 Conclusions

The capability of the developed superstructure 10 in identifying improved stand-alone thermal structures has been demonstrated simultaneously allowing for both MSF and MED stages. It is important, however, to stress that the enabling features of the superstructure 10 are not restricted to only the illustrative case studies presented earlier in this paper. Given the flexible methodology applied to modeling the superstructure 10, it can be easily modified for alternative useful studies. One such possible study is to assess the merits and trade-offs associated with integrating thermal desalination plants with thermal vapor compression units through a steam ejector. Another study of interest is to investigate whether subcooling the input heating steam 18 improves plant performance; the contrary claim has been made in the literature. Yet another study could assess alternative optimal configurations integrating both thermal and membrane technologies as part of hybrid thermal-membrane scheme.

Further, the superstructure 10 can assist in the production of optimal operation for fixed design. If a plant is already in use (i.e., if the component set and size of components are already specified), the superstructure 10 can be easily adjusted to optimize operating conditions.

Another useful application that the superstructure 10 lends to designers is testing the sensitivity of configurations to relaxed technological constraints. For instance, if the top brine temperature is increased to 120° C. instead of 70° C. through improved anti-scalants, optimization of the superstructure 10 can help identify how much improvement such a development would yield and would also inform the designers of the predicted flow patterns under the more favorable conditions. This sort of work, repeated for different possible constraints, can help identify which of the technological constraints are most limiting, a process that can help optimally allocate funding for future R&D projects pertaining to thermal desalination. A similar approach is used in Mitsos, et al., "Methodology for the design of man-portable power generation devices," 46 Industrial & Engineering Chemistry Research 7164-7176 (2007) for micropower generation and to demonstrate the importance of limits of operating temperature and performance of components.

Additional improvements that may be made to modeling include the implementation of more accurate seawater properties, including the introduction of a latent heat of evaporation/condensation of water that is temperature dependent. Moreover, the effect of the number of repeating of superstructure units can be studied beyond the assumed twelve repeating units. For instance, approximately 40 stages may be needed in order for MSF structures to realistically compete with MED structures in terms of distillate production. Moreover, the additional options of brine re-circulation and brine mixing can be afforded to the last unit within the superstructure 10, which enhances the possibility of identifying improved structures. These more-detailed models can be used either directly in superstructure optimization, albeit making the optimization problem substantially harder, or they can be used to analyze the interesting unconventional structures identified using the simpler models.

7 Novel MED-MSF-TVC Configurations

The following sections examine the advantages of intermediate thermal vapor compression by assessing its influence on several key parameters pertaining to both thermodynamic efficiency and economics. By doing so, desirable system characteristics, such as the optimal location of vapor extraction, the optimal quantity of vapor to entrain and optimal ejector compression ratio, are pinpointed. The overall goal is to propose alternative improved integrated structures, possibly of unconventional flow patterns, that are capable of maximizing the synergistic benefits of combining thermal desalination systems with thermal vapor compression systems.

8 Problem Definition

For fixed seawater conditions, the optimization problem proposed here is to identify the optimal integrated configuration given a fixed flow-rate of motive steam 18 available at a pre-determined pressure. The choice of these input parameters is presented in Table 3, although the study could be easily replicated for alternative choices of these parameters. In determining the optimal structure, the optimization problem is to determine all of the variables presented below:
- the choice of hardware components;
- the routing of brine, feed and vapor flows within the system;
- the sizing of the components including the effects 14 and feed preheaters 12;
- the pressure within each of the effects 14 and flash boxes 16 and 44;
- the choice of how much vapor to entrain in ejector; and
- the pressure of entrained vapor.

TABLE 3

Choice of parameters for present study including motive steam and seawater conditions.

| Parameter | Value |
|---|---|
| Motive steam flowrate (kg/s) | 10 |
| Motive steam pressure (bar) | 15 |

TABLE 3-continued

Choice of parameters for present study including motive steam and seawater conditions.

| Parameter | Value |
|---|---|
| Seawater temperature (° C.) | 25 |
| Seawater salinity (g/kg) | 4.2 |

Note that the vapor temperature to the first effect 14 is not fixed, but rather determined by these parameters.

Section 9 presents the model developed for the sake of this optimization, while Section 10 details the characteristics of the optimization, including the solvers used in addition to both the choice of objective functions and imposed constraints.

9 Modeling

To enable the optimization procedure intended for this study, a flow model of the integrated desalination and thermal compression plant is constructed. Note that the model corresponds essentially to standard models in literature. Such a model is adequate for producing a methodology for structural optimization and identification of interesting potential structures. Substantially improving the model accuracy would result in a significantly more complicated model; this would change little in our methodology but present an optimization problem that is most likely intractable with state-of-the-art optimizers. Section 9.1 presents a graphic illustration of the superstructure 10 used to represent the different possible thermal desalination structures allowed in this paper. Section 9.2 details the methodology used to integrate the thermal desalination model with the steam ejector, depending on choice of vapor extraction. Finally, Section 9.3 details the mathematical model used to represent performance of the steam ejector, detailing in the process the constraints required to satisfy proper operation.

9.1 The Thermal Desalination Superstructure

Figure 10:
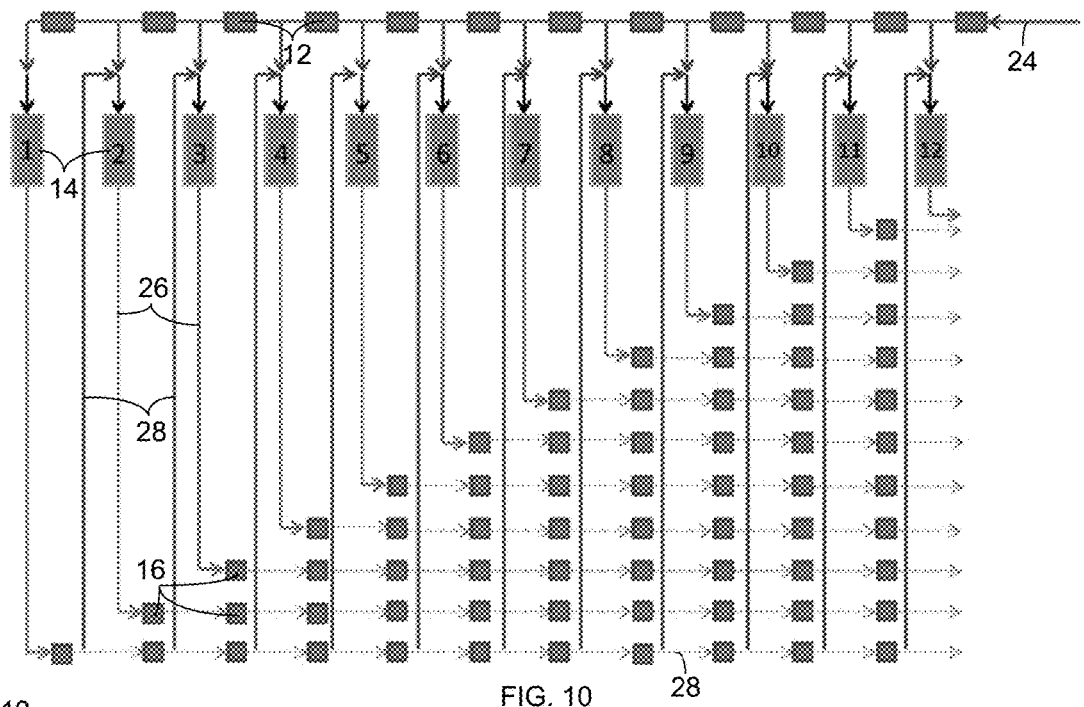
FIG. 10 is a schematic illustration of a superstructure capable of representing different combinations of MSF, MED, and feed preheater combinations. Vapor routings are not shown.

The thermal desalination superstructure 10 utilized in this work is represented in FIG. 10. While the superstructure 10 can be used to represent any number of repeating units, the particular superstructure 10 utilized in this work considers the specific example of 12 repeating units. Each theoretical unit comprises an effect 14, a preheater 12, a distillate flash box 44 (not shown in FIG. 10 for simplicity) and a set of brine flash boxes 16. It is important to clarify that just because a superstructure 10 can represent a particular component does not mean that this particular component will be present in the finalized optimal structure. In fact, it will be observed in the results section, that only a subset of allowable components is usually necessary. Manipulation of the component set in use is in principle controlled by the decision of what flow enters each component coupled with the decision of how to divide flows leaving a particular component. A detailed description of the different allowed flow options can be found in the preceding sections.

Ultimately, a very large amount of structures can be represented through the proposed superstructure 10. These structures not only include prevalent configurations such as the FF-MED and PC-MED, but also alternative non-conventional, yet potentially advantageous structures. Examples of potential structures include an MED structure that transitions to an MSF structure and a FF MED structure that transitions to a PC structure.

9.2 Integration with Steam Ejector

To allow investigating whether the entrainment of a particular vapor stream is justified, the superstructure 10 discussed above is modified. Within the unit where the extraction occurs, this updated model accounts for the fact that only a fraction of the unit's generated vapor is used as heating steam 18 to the next unit. Moreover, the model modified the flow rate of heating steam 18 to the first effect 14 to account for the addition of entrained vapor over and above the incoming motive steam 18.

Figure 11:
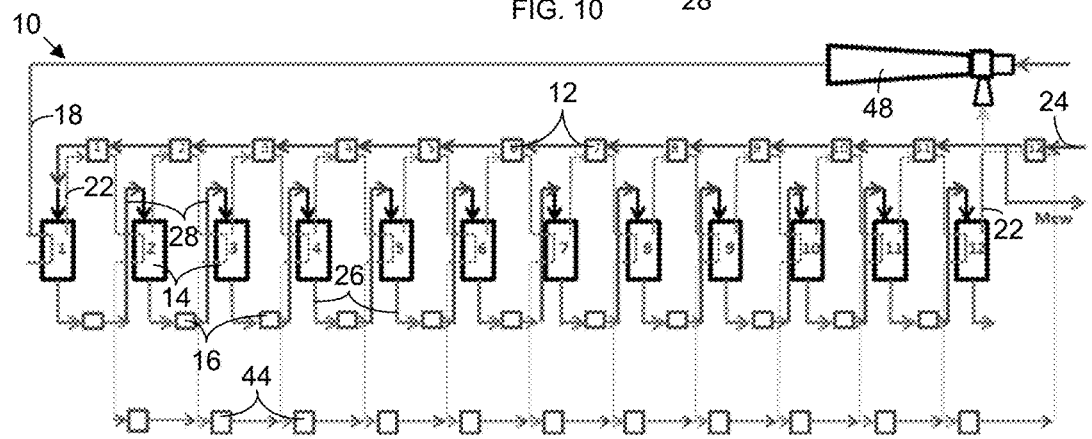
FIG. 11 is a schematic illustration of an example of a FF MED-TVC configuration with vapor extracted from last effect. Only a fraction of the vapor generated in last unit needs to be condensed in the down-condenser.

Herein, only the thermal compression of vapors 22 produced in the 4th, 6th, 9th and the 12th (last) units is considered. While the analysis can be extended for vapors produced in any of the units, the proposed sample is sufficient to capture the dependence of the different variables on location of vapor extraction. To this end, four different models are constructed based on mass, energy and species balances for each of the possible system components. Sample schematics illustrating how vapor redirection occurs are shown in FIGS. 11 and 12, which include a thermal vapor compressor 48.

9.3 Model of the Steam Ejector

One step in studying the performance of the integrated systems is the evaluation of the performance of the steam ejector. Although numerous steam ejector models exist in the literature, the model used herein is based on the simple semi-empirical model proposed by H. El-Dessouky, "Modelling and simulation of the thermal vapour compression desalination process," Nuclear Desalination of Seawater 315-338 (1997) and H. El-Dessouky, "Multiple effect evaporation—vapour compression desalination processes," 78 Chemical Engineering Research and Design, 662-676 (2000). The particular correlation is chosen since it avoids lengthy computations of correction factors, which are conditional upon the pre-availability of a detailed design of the ejector.

The used model determines the required mass of motive steam 18 to compress a unit mass of suctioned vapor (a parameter known as the entrainment ratio, Ra. Ra can be computed for any given motive steam pressure ($P_m$), suction pressure ($P_{ev}$), and desired discharge pressure ($P_s$) according to the relation below:

$$Ra = \frac{M_m}{M_{ev}} = \\ 0.296 \frac{(P_s)^{1.19}}{(P_{ev})^{1.04}} \left(\frac{P_m}{P_{ev}}\right)^{0.015} \left(\frac{3\times10^{-7}(P_m)^2 - 0.0009 P_m + 1.6101}{2\times10^{-8}(T_{ev})^2 - 0.0006(T_{ev}) + 1.0047}\right), \quad (23)$$

where $T_s$, $T_m$, and $T_{ev}$ respectively refer to the temperatures of the discharge vapor streams, the motive steam 18 and the entrained vapor, all expressed in ° C.; all of the pressure values are expressed in kPa.

H. El-Dessouky, "Modelling and simulation of the thermal vapour compression desalination process," Nuclear Desalination of Seawater 315-338 (1997) further recommends the conditions required to ensure normal, reliable and stable operation of the steam ejector. These conditions are outlined below:

$Ra \leq 4$;

$10°\,C. \leq T_{ev} \leq 500°\,C.$;

$100\,kPa \leq P_m \leq 3500\,kPa$; and $1.81 \leq CR \leq 6$, where the compression ratio, CR, is defined as the pressure ratio of the discharge stream leaving the ejector to the vapor stream entrained in the ejector.

10 Optimization

10.1 Objective Function

The proficiency of operating a plant is of utmost importance when deciding to construct a particular plant. In desalination, the total generated revenue is dependent not only on the quantity of water produced, but also the selling price of water. The main operating costs, on the other hand, are associated with the price of the total fuels required to supply heat to the thermal desalination plant. This, in turn, is dependent on local fuel costs in addition to the quantity of fuel used. Finally, the main capital costs are closely tied with the economics of construction of the flash boxes 16 and 44, the effects 14 and the preheaters 12.

The price-independent performance metrics are used in this work to allow comparison of different structures. The first metric used is the gain output ratio (GOR), defined as the mass ratio of the total distillate production in the plant to the total input motive steam 18. Since the pressure of the motive steam 18 is fixed in this study, the GOR is a useful metric that can be used to directly gauge the thermodynamic efficiency of a structure by quantifying distillate production from a fixed exergy input. In essence, the GOR relates the revenue generated in a plant to the operational costs associated with making steam 18 available. The second metric is the specific heat transfer area requirements (SA), defined as the total heat transfer area (within effects 14, feed preheaters 12 and the down condenser) per unit distillate. The drawback of the metric is that it inherently assumes that the cost of heat transfer areas within an effect 14 and preheater 12 are similar. It does, however, account for tradeoffs; for instance, a flash chamber at a low temperature results in high specific volume need but low heat transfer area need in effects 14 and feed preheater 12.

Literature ultimately compares different plants, which differ in both their production capabilities alongside their area requirements, thus rendering comparison between structures very cumbersome. A particular structure may result in higher GOR, whereas another may require lower SA. To counter this problem, herein, multi-objective optimization is performed, whereby the GOR is maximized while the SA is minimized. A Pareto frontier is constructed that informs designers of the minimum SA for each GOR requirement. It is left to the designer to decide which of the numerous Pareto-optimal points is preferable.

10.2 Optimization Methodology

For each of the four models constructed, the multi-objective optimization approach implemented herein is approximated in a number of discrete steps. In each step, the GOR is fixed prior to optimization, and SA are minimized for. The process is repeated for a range of GOR values. This discretization procedure is successful in reducing the problem to a series of single objective function optimization, thus enabling the use of black box solvers. All of the models in this paper are developed in the General Algebraic Modeling System (GAMS), and globally optimized using the BARON deterministic global algorithm capable of solving mixed integer non-linear programming problems. Note that, altogether, the method can guarantee the global solution of the optimization problems and thus the Pareto frontier; this cannot be guaranteed using stochastic algorithms, such as evolutionary multi-objective optimizers.

10.3 Constraints to Allow Justified Comparison of Different Structures

The predominant structures that arise from different optimization problems can significantly differ. More specifically, feed 24 and cooling water flows can vary drastically among structures, which would make comparing structures based on GOR and SA alone, without considering variation in other operating costs, unjustified. Larger feed 24 and cooling water flows increase operational costs through elevating both pretreatments costs and system pumping requirements. To minimize large discrepancies between structures and allow for more fair comparison, additional constraints are imposed.

The first constraint imposes that the recovery ratio, RR, in any structure is greater than or equal to 0.2, where the RR is defined as the fraction of the total feed to the system (less the cooling water) that is converted to distillate. Note that to attain minimum SA, optimization favors minimum RR, as allowed by the value of the GOR imposed. This is because a lower RR lowers the average salinity of the brine 26 leaving each effect 14, thus reducing boiling point elevation losses, BPE. Lower BPE losses, in turn, increase the prevalent temperature differential between the heating vapor and the brine 26 being heated within each effect 14, thereby reducing area requirements. Low RR, however, detracts from distillate production capability of plants mainly by increasing feed sensible heating requirements, which alternatively could have been used to achieve further evaporation. Ultimately, for the lower GOR structures, the imposed inequality constraint is synonymous to setting the RR exactly to 0.2. For higher GOR structures, the constraint allows optimization to resort to higher RR values that allow for satisfaction of distillate requirements. Caution, however, must be taken when comparing structures of differing RR's, where additional merit is given to those structures with higher RR, all things else equal.

The second constraint imposes that the maximum allowable ratio of cooling water to total distillate (CW-TD ratio) is set to 4. From an exergy accounting standpoint, allowing the brine blow-down to be output at a temperature very close to the seawater temperature is optimal. This arrangement, however, results in extremely large cooling water flow requirements. Generally, availability of infinite cooling water can result in a simultaneous increase in distillate production (due to lower feed sensible heating requirements in last effect 14), and reduction in area requirements (larger possible average temperature difference between effects 14). Thus, restricting the amount of cooling water on a per unit of distillate production basis is a good mechanism to maintain a realistic operating plant. Although the CW-TD constraint is introduced as an inequality constraint, it is generally always satisfied with equality by the optimizer.

The methodology presented allows the introduction of additional constraints, such as, for instance, imposing a minimal temperature for an effect 14.

11 Results and Discussion

11.1 Intermediate Vapor Extraction Increases Maximum Possible GOR

For a fixed flow rate of motive steam 18 at a predesignated pressure, results confirm that intermediate vapor extraction increases the maximum distillation production. Among the four extraction options in this study, Table 4 indicates that the maximum GOR is attained by the configuration with ES=9 (extraction at the ninth stage), which is capable of 35 percent more distillate production compared to the maximum achievable amount by the conventional MED-TVC. The next best alternative is the structure with ES=6, which itself is capable of achieving 10 percent additional distillate production. It is interesting to note that the optimal ES=4 structure is unable to match the distillate production capacity of the conventional MED-TVC, for reasons to be discussed later in the section. From an implementation standpoint, structures represented by maximum distillate production must be avoided as they require near infinite areas. It is still instructive, however, to use highlight prevalent features of these structures that enhance their distillate production capability.

TABLE 4

Properties of maximum GOR structures for the different vapor extraction locations.

| ES | $GOR_{max}$ | Ra | $P_{ev}$ | CR | $Tv_{12}$ | $T_{HS1}$ | $T_{HS1} - Tv_{12}$ | RR |
|----|-------------|------|-------|------|-------|-------|-------|------|
| 4  | 15.4        | 0.93 | 15.2  | 1.81 | 29.2  | 67.1  | 37.9  | 0.2  |
| 6  | 17.5        | 0.95 | 17.5  | 1.81 | 28.8  | 70.4  | 41.6  | 0.2  |
| 9  | 21.5        | 0.86 | 9.1   | 1.81 | 28.1  | 56.3  | 28.2  | 0.2  |
| 12 | 16          | 1.42 | 5.4   | 2.9  | 34.2  | 55.3  | 21.1  | 0.25 |

To lay the foundation for the subsequent analysis, it is important to realize that integration with thermal vapor compression in the traditional MED-TVC increases GOR compared to the conventional MED precisely because it enables the reuse of the vapor produced in the last effect 14 as heating steam 18 to all of the effects 14 that precede it. It does so by first increasing the amount of heating steam 18 available to the 1st effect 14. This increases vapor production in the 1st effect 14, which in turn increases vapor production in the 2nd effect 14. This trend continues up until the last effect 14. For increased distillate production goals, this is a much preferred scheme compared to the scheme common to the stand-alone MED, whereby most of the latent heat of the last effect vapor is transferred to cooling water that is eventually returned to the sea.

For a fixed supply of motive steam, it is intuitive that the entrainment of the largest amount of vapor (i.e., low Ra) is desirable. Within steam ejectors, there is a prevalent trade-off between the amount of the low-pressure vapor that can be compressed and the CR that results. Precisely, increasing the amount of vapor entrained decreases the CR. This analysis leads us to conclude that for the maximum GOR, the optimal structure should have the lowest allowable pressure ratio, as allowed by ejector. The previously discussed lower bound on the CR is 1.81.

The downfall of the conventional MED-TVC is that it extracts vapor at the lowest system pressure corresponding to the pressure existing in the last effect 14. Assuming the last effect 14 operates at a temperature slightly larger than the seawater temperature, a CR of 1.81 would result in a heating steam temperature that is not sufficiently elevated to drive a 12-effect MED. As an illustrative example, if the vapor pressure in the last effect 14 is 4 kPa (corresponding to 30° C. temperature within the last effect 14), a CR of 1.81 would result in a heating steam temperature of approximately 40° C. Given that the average SPE losses alone within each effect 14 are approximately 0.8° C., the total temperature difference is insufficient to drive heat transfer within 12 effects 14.

The intermediate vapor extraction scheme tackles this problem. By entraining vapors at higher pressures, it is possible to entrain the maximum amount of vapor as allowed by ejector operation. Table 4 confirms that for ES=4, 6, and 9, the limiting factor to how much vapor can be entrained is the steam ejector operation limits, while for the case of ES=12, the limiting factor is ensuring the optimal structure whereby there is both a sufficient temperature difference for heat transfer within each effect 14, while satisfying imposed constraints on how much cooling water can be utilized.

Variation in the maximum GOR among the different extraction locations can be attributed to the number of stages the entrained vapor is reused in. For the ES=9 structure, the entrained vapor once compressed is used to generate additional vapor in the 1st effect 14 through to the 9th effect 14. The 10th effect 14 would generally receive the same amount of vapor had no compression been present in the system. For the ES=4 structure, however, the entrained vapor is only reused in 1st effect 14 through to the 4th effect 14. This explains why the ES=4 structure, though capable of entraining more vapor, is still not capable of producing as much distillate as the conventional MED-TVC. In this light, it is predicted that for similar entrainment ratios, larger maximum GOR are possible for structures with the later extraction stage as is confirmed in Table 4.

11.2 Lower Area Requirements for Structures with Intermediate Vapor Compression

The performed study confirms that the location from where the vapor is extracted for entrainment is an important consideration that not only affects the range of possible GOR, but also heavily influences the minimum SA requirements. Table 5 illustrates the results of the optimization of a 12-unit superstructure 10 with vapor extractions from the 4th, 6th, 9th and 12th (last) effect 14, respectively.

TABLE 5

Comparison of minimum SA (m² s/kg) at different GOR for different ES.

| ES | GOR = 10 | 11  | 12  | 13  | 14  | 15   | 16   | 17  | 18  | 19  |
|----|----------|-----|-----|-----|-----|------|------|-----|-----|-----|
| 4  | 262      | 297 | 332 | 380 | 459 | 768  | —    | —   | —   | —   |
| 6  | 269      | 299 | 335 | 377 | 418 | 478  | 555  | 710 | —   | —   |
| 9  | 275      | 314 | 344 | 378 | 416 | 461  | 521  | 601 | 711 | 866 |
| 12 | 333      | 359 | 457 | 606 | 823 | 1217 | 3357 | —   | —   | —   |

Further, the choice of the optimal location of vapor extraction is highly dependent on exact GOR requirements. It is observed that for lower range of GOR requirements (10≤GOR≤12), compression of a portion of vapor produced in 4th unit is most favorable (ES=4). For the higher range of GOR requirements (13≤GOR≤16), intermediate vapor extraction from later effects 14 (ES=9) is most advantageous. For all GOR requirements, the conventional MED-TVC (ES=12) is undesirable; it requires 27 additional % SA requirements compared to ES=4 for GOR=10, double the SA requirements compared to ES=9 for GOR=14, and more than six times the SA requirements compared to ES=9 for GOR=16.

Using the case of GOR=15, Table 6 highlights important parameters that can be compared to understand variation in the SA requirements between structures dependent on their extraction location. The parameter, $$\frac{T_{b_1} - T_{b_{ES}}}{ES - 1},$$

computes the average temperature difference in the effects 14 that precede the compression, while $$\frac{T_{b_{ES}} - T_{b_N}}{N - ES}$$

computes the average available temperature difference in the possible effects/stages that follow vapor extraction. Finally, $$\frac{T_{b_1} - T_{b_N}}{N - 1}$$

is used to compute the average temperature difference in the entire structure. Knowing available temperature difference in entire structure. Knowing available temperature differences is advantageous because they heavily influence area requirements and help inform choice of hardware. For instance, MSF stages can approximately double distillate production with double the temperature difference. To a first order, however, MED effects 14 do not benefit from additional temperature differences from a distillate production standpoint, though required heat transfer areas are reduced with larger temperature differences. The optimization formulation weighs all different choices to first ensure distillate production requirements are met and, subsequently, to ensure that it is done with the optimal component set that are least area intensive.

11.3 Optimal Hybrid Structures

Figure 15:
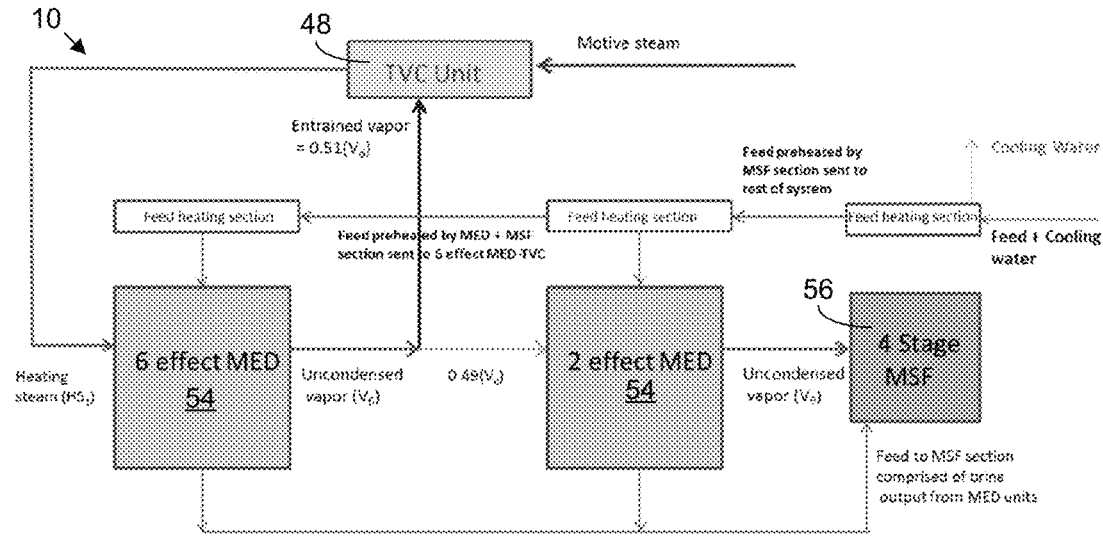
FIG. 15 is a simplified block diagram illustrating a maximum GOR structure for ES=6.
Figure 16:
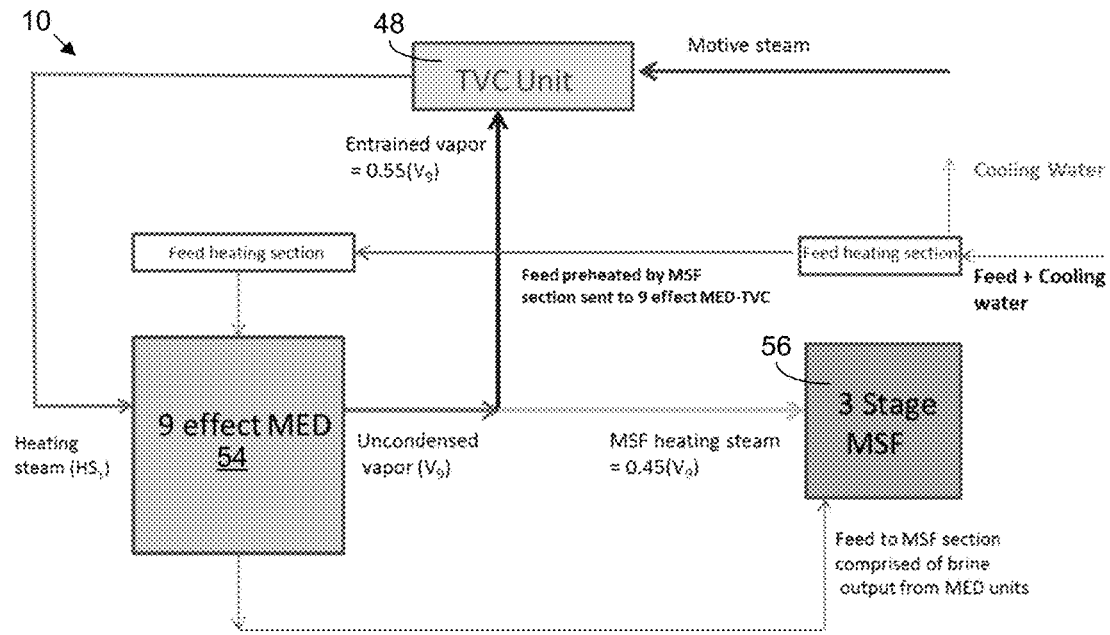
FIG. 16 is a simplified block diagram illustrating a maximum GOR structure for ES=9.

The optimal hybrid structures take on varying forms depending on location of vapor extraction, as indicated in both Tables 7 and 8. A schematic of the MED-TVC+MED+MSF and the MED-TVC+MSF structures are presented in FIGS. 13 and 14, respectively, while a clarification of the routing of the different flows within each of structures as well as a justification of this naming is provided in Section 11.4. Simplified block-diagrams detailing the maximum GOR structures for ES=6 and 9 can be found in FIGS. 15 and 16.

TABLE 7

Optimal structures corresponding to different ES for GOR = 15.

| ES | Structure |
|---|---|
| 4 | MED-TVC + MED + MSF |
| 6 | MED-TVC + MED + MSF |
| 9 | MED-TVC + MSF |
| 12 | MED-TVC |

TABLE 8

Optimal structures corresponding to different ES for maximum GOR.

| ES | Structure |
|---|---|
| 4 | MED-TVC + MED + MSF |
| 6 | MED-TVC + MED + MSF |
| 9 | MED-TVC + MSF |
| 12 | MED-TVC |

TABLE 6

Properties of optimal structures for GOR = 15 for different vapor extraction locations.

| ES | Ra | CR | $T_{HS_1}$ | $T_{v_{ext}}$ | $T_{v_{12}}$ | $\frac{T_{b_1} - T_{b_{ES}}}{ES - 1}$ | $\frac{T_{b_{ES}} - T_{b_N}}{N - ES}$ | $\frac{T_{b_1} - T_{b_N}}{N - 1}$ | SA |
|---|---|---|---|---|---|---|---|---|---|
| 4 | 0.97 | 1.81 | 73.1 | 59.6 | 29.4 | 3.2 | 3.8 | 3.7 | 768 |
| 6 | 1.08 | 2.02 | 72.4 | 56.6 | 30.6 | 2.5 | 4.5 | 3.6 | 477 |
| 9 | 1.73 | 3.17 | 72.5 | 47.6 | 30.6 | 2.7 | 5.1 | 3.6 | 461 |
| 12 | 1.67 | 3.4 | 56.6 | 32.9 | 32.9 | 2.0 | N/A | 2.0 | 1217 |

Intermediate vapor compression is found to reduce SA requirements for two main reasons. The first reason is that intermediate compression of vapor allows a larger fraction of the total heat transfer to occur in the initial effects 14 (since more heating steam 18 is available to the effects 14 that precede extraction), which are characterized by highest overall heat transfer coefficients. This is in contrast to the conventional MED-TVC where a near equal amount of heat transfer occurs in all effects 14. The second reason is that intermediate compression enables larger ($T_{HS_i}-Tv_{12}$) factors as seen in Table 6, which allows a larger average temperature difference in the effects 14. This feature is possible since the compression of higher pressure streams allows a higher heating steam temperature to the first effect 14. Moreover, low brine blow down temperatures can still be maintained, since the uncompressed vapor is still capable of driving a thermal desalination whereby the last effect 14 can approach the temperature of seawater, as allowed by cooling water requirements.

11.4 Flowsheets of Optimal Hybrid Structures

Within any superstructure unit, the input heating steam 18 can be directed in three alternative feasible ways. The first choice involves sending all of the heating steam 18 to the MED effect 14 where it is responsible for vapor production. The second feasible option is to utilize the heating steam 18 exclusively for feed pre-heating purposes. The final option is to allow a fraction the heating steam 18 to preheat the feed 24, while the other fraction is utilized to generate vapor in an MED effect 14.

Figure 13:
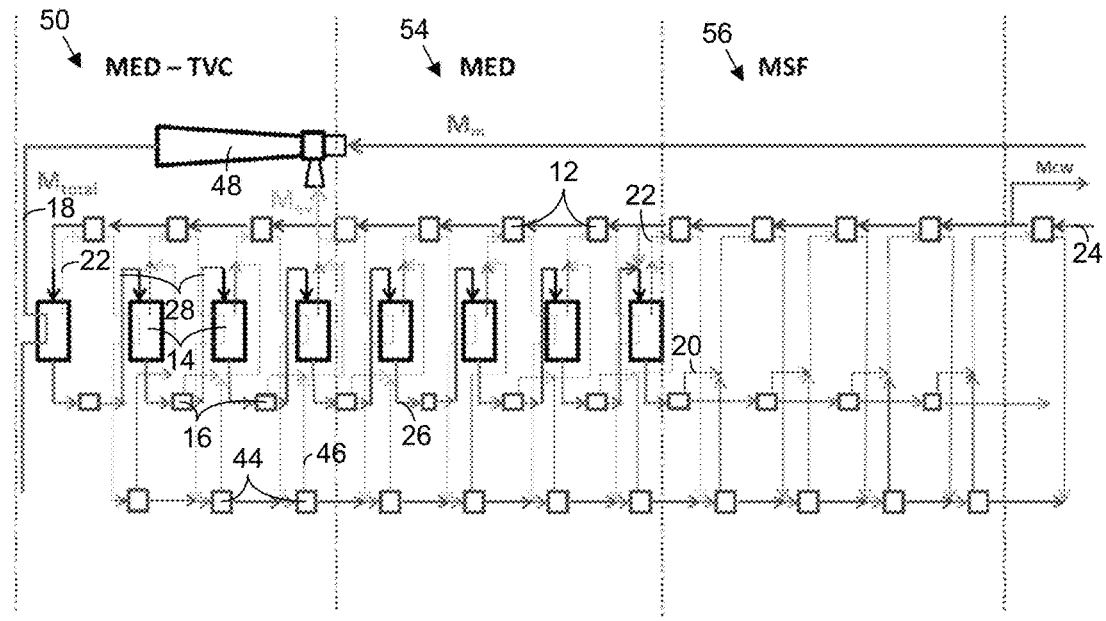
FIG. 13 is a schematic illustration of an example of an MED-TVC+MED+MSF with vapor extraction at N=4.
Figure 14:
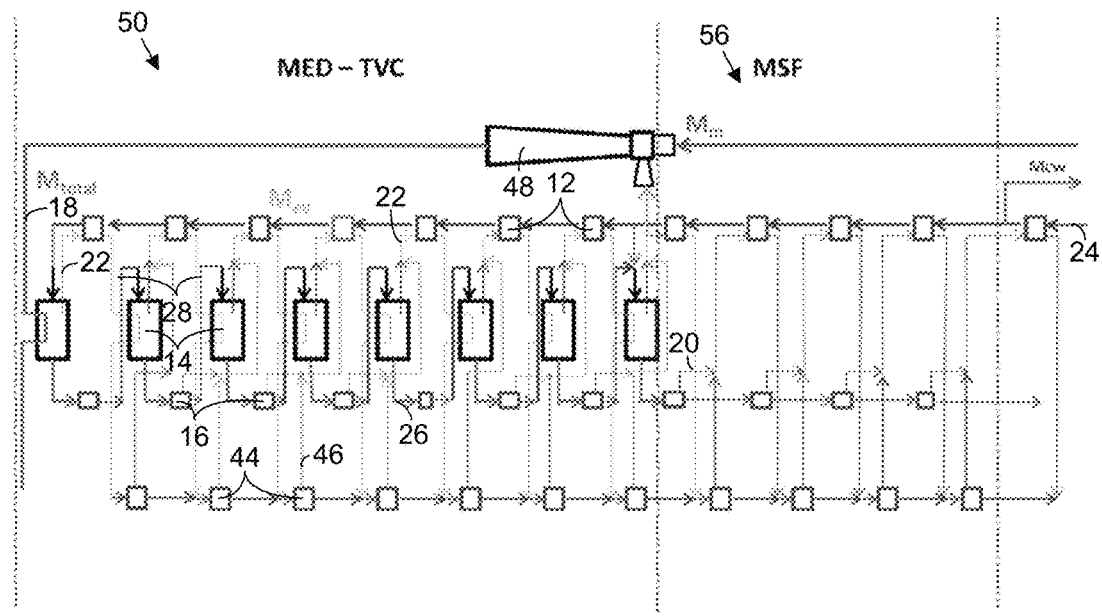
FIG. 14 is a schematic illustration of an example of an MED-TVC+MSF with vapor extraction at N=8.

The MED-TVC+MED+MSF structure, presented in FIG. 13, is such a structure which utilizes all of the aforementioned options. In the effects 14 that precede the extraction, a typical MED structure results. All of the discharge steam 18 exiting the steam ejector is directed towards vapor production in the 1st effect 14, while the intermediate generated vapors are split between feed pre-heating and vapor production. This part of the structure is referred to as the MED-TVC portion 50 of the plant and includes both the steam ejector as well as all of the effects 14 leading up to and including the extraction stage. At the extraction stage, the generated vapor is split. The portion that is not entrained in the ejector serves as heating steam 18 to a series of MED effects 14 and their corresponding preheaters 12. This portion of the plant, made up of the unentrained vapor as well as the MED effects 14, is referred to as the MED portion 54 of the plant. At a later stage, the structure transitions to yet another form, whereby all of the generated vapor is dedicated solely for pre-heating purposes. This portion of the plant, which is devoid of any MED effects 14, produces vapor solely by brine and distillate flashing. As a result, it is termed the MSF section of the plant. The integration of the three portions of the plant described is therefore termed the MED-TVC+MED+MSF structure. The MED-TVC+MSF structure, on the other hand, is represented in FIG. 14. The MED-TVC section portion of the plant is similar to that described earlier. At the extraction stage, however, all of the unentrained vapor is directed completely towards pre-heating the feed 24. This represents the MSF section 56 of the plant.

For both structures, the vapor produced in the last MSF stage is cooled in a down-condenser, whereby additional cooling water is inserted to remove any additional heat that cannot be carried away by the incoming feed 24. Moreover, for both structures, the routing of the feed 24 is one such that all of the incoming feed 24 is inserted into one pre-heating line. Consequently, for the MED-TVC+MED+MSF structure, by the time the feed 24 eventually enters into the MED-TVC section 50, it would already be significantly pre-heated by the vapor produced in both the MSF and the MED sections 56 and 54 that follow it. Similarly, the feed 24 that enters the MED section 54 is preheated in the MSF section 56. For the MED-TVC+MSF structure, the feed 24 entering MED-TVC section 50 is preheated by the MSF structure 56. In both structures, the brine routing in the structures is such that the brine entering into the MSF stages is composed of brine streams 26 exiting the earlier MED effects 14 within the integrated structure.

11.5 Advantages of Hybrid Structures

Numerous benefits are associated with the hybridized schemes proposed. For instance, the feed pre-heating requirements in the MED-TVC section 50 are greatly reduced owing to the fact that the feed 24 enters the MED-TVC section 50 at a temperature significantly elevated compared to the seawater temperature. This has the implication of increasing the vapor production in the initial MED effects 14, which translates into additional vapor production in the entire structure, thereby increasing GOR. Another notable advantage is that a significant reduction in the cooling water requirements is possible, resulting from the fact that only vapor produced by flashing in the last MSF section 56 needs to be condensed, as compared to needing to condense the larger amount of vapor that would typically form in the more efficient boiling process that occurs with an MED effect 14. By setting a low temperature drop in the last MSF stage of both plants, it is possible to greatly reduce the vapor flow that needs to be condensed. Given that the cooling water requirements in this study are fixed, this arrangement enables a lower increase in the temperature of the feed 24 as it flows through the down condenser. This is desirable since it allows the last effects 14 and stages to operate at lower temperature conditions, which both increases thermodynamic efficiency and reduces SA requirements in system by increasing the average temperature difference in the effects 14.

Additional advantages include an increased production of vapor by distillate flashing in both the MED and the MSF sections 54 and 56, which is enabled by the large amount of distillate that is made available to the corresponding distillate flash boxes 44 from the high distillate-producing MED-TVC section 50 that precedes them. Finally, since the bulk of the total feed 24 to the system is extracted to be fed to MSF stages, the pumping requirements are expected to be significantly lower than what they alternatively would have been had all of the feed 24 been directed to the 1st effect 14; an arrangement where pressure losses would be large owing to the large amount of brine circulation required. This, however, cannot be confirmed since pumping requirements are not directly computed in this work.

| Nomenclature | | |
|---|---|---|
| Variables | Name of Variable | Units |
| T | Temperature | K |
| X | Salinity | g/kg |
| N | Flow variable | kg/s |
| F | Feed to an effect | kg/s |
| HS | Heating steam to a superstructure unit | kg/s |
| V | Saturated vapor | — |
| D | Distillate (saturated liquid) | — |
| B | Brine exiting an effect | kg/s |
| Q | Rate of heat transfer | kJ/s |
| L | Latent heat of evaporation/condensation | kJ/kg |
| $c_p$ | Specific heat capacity at constant pressure | kJ/(kgK) |
| P | Pressure | kPa |
| M | Heating steam to first effect | kg/s |
| CW | Cooling water | kg/s |
| Subscript | | |
| in | Input to a compound | |
| out | Output from a compound | |
| sat | Corresponding to a saturation conditions of a compound | |
| i | Component number | |
| ev | Entrained vapor | |
| s | Discharge vapor | |
| m | Motive steam | |
| ext | Extraction stage | |
| Superscript | | |
| BE | Brine evaporation within effect | |
| BF | Brine flashing within brine flash box | |
| DF | Distillate flashing within distillate flash box | |
| Abbreviations | | |
| FPH | Feed preheater | |
| EFF | Effect | |
| BFB | Brine flash box | |
| DFB | Distillate flash box | |
| BPH | Brine preheater | |
| RO | Reverse osmosis | |
| NF | Nano filtration | |
| MSF | Multi-stage flash distillation | |
| MED | Multi-effect distillation | |
| FF | Forward feed | |
| PC | Parallel cross | |
| PF | Parallel feed | |
| TVC | Thermal vapor compression | |
| MSF | Multi-stage flash distillation | |
| MED | Multi-effect distillation | |

| Parameters | Name of Variable | Units |
|---|---|---|
| PR | Performance ratio | — |
| RR | Recovery ratio | — |
| SA | Specific heat transfer area requirements | $\dfrac{\text{kgs}}{\text{m}^2}$ |
| Ra | Entrainment ratio | — |

-continued

| Parameters | Name of Variable | Units |
|---|---|---|
| CR | Compression ratio | — |
| ES | Extraction stage | — |
| GOR | Gained output ratio | $\frac{kgs}{m^2}$ |

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for thermal-based desalination, comprising a feed routing including a series of preheaters for flow of a liquid feed; brine routings for flow of concentrated brine from the liquid feed; vapor routings for vapor generated from the liquid feed; a series of multi-effect distillation effects, each of the effects coupled with at least one routing selected from the feed routing and the brine routings and with one of the vapor routings; and a series of brine flash boxes coupled with at least one routing selected from the feed routing and the brine routings and with one of the vapor routings, the method comprising:

flowing a liquid feed through the feed routing and using the preheaters to heat the liquid feed in the feed routing;

using at least one of a plurality of splitters between preheaters to selectively direct at least one of (a) a first portion of the flow of the liquid feed from the feed routing through at least one of the multi-effect distillation effects in the series of multi-effect distillation effects and (b) a second portion of the flow of the liquid feed through a subsequent preheater in the series of preheaters, and to shift allocation of the flow between the first portion and the second portion, wherein the first portion of the liquid feed flows into an inlet of a first effect, where the feed liquid is heated to produce vapor that is directed through at least one of the vapor routings and brine that is directed through at least one of the brine routings;

flowing a first part of the vapor produced in at least one effect from one of the vapor routings through at least one of the preheaters to transfer heat from the vapor to the liquid feed in the feed routing;

flowing a second part of the vapor produced in the at least one effect from another of the vapor routings to a subsequent effect in the series;

flowing brine produced in each effect from at least one of the brine routings through a brine flash box and heating the brine to release additional vapor and produce a concentrated brine that is directed through another of the brine routings; and using additional splitters, each of which is downstream of a flash box in the series of brine flash boxes in at least one of the brine routings, to selectively direct the concentrated brine from each flash box into at least one of (a) a first stream that is directed through one of the brine routings to another flash box in the series of brine flash boxes and (b) a second stream that is directed through another of the brine routings into another effect.

2. The method of claim 1, further comprising adjusting flow through the feed, brine, and vapor routings to achieve at least one result selected from (a) increasing the performance ratio of distillate production; (b) decreasing specific heat transfer area requirements; (c) increasing recovery ratio; and (d) increasing gained output ratio.

3. The method of claim 2, further comprising:

extracting liquid feed at locations between different pairs of preheaters; and injecting the extractions of liquid feed into respective multi-effect distillation effects.

4. The method of claim 3, further comprising blending brine that exits a brine flash box with feed liquid fed to a multi-effect distillation effect.

5. The method of claim 4, further comprising changing at least one of the following parameters to achieve at least one of the results: (a) positions between preheaters at which liquid feed is extracted from the feed routing; (b) the flow of concentrated brine through the brine routings to change which brine flash box feeds concentrated brine to a particular effect among the series of multi-effect distillation effects; (c) sizing of at least one of the routings, brine flash boxes, multi-effect distillation effects, or preheaters; and (d) pressure in at least one of the multi-effect distillation effects or brine flash boxes.

6. The method of claim 5, wherein the parameter is changed in response to changes in local operating conditions.

7. The method of claim 1, further comprising:
injecting vapor into a thermal vapor compressor;
compressing steam in the thermal vapor compressor; and
delivering the compressed steam to at least one of the multi-effect distillation effects.

8. The method of claim of claim 1, further comprising:
directing the vapor from the subsequent effect in the series to a down condenser;
directing the liquid feed through the down condenser; and
condensing the vapor in the down condenser.

9. The method of claim 8, further comprising flowing vapor from the series of brine flash boxes through the down condenser.

10. The method of claim 1, further comprising flowing vapor from the preheaters through a series of distillate flash boxes.

11. The method of claim 1, further comprising flowing the brine sequentially through the series of brine flash boxes.

12. A method for producing an improved thermal-based desalination system, comprising providing a superstructure which comprises a feed routing including a series of preheaters for flow of a liquid feed; brine routings for flow of concentrated brine from the liquid feed; vapor routings for vapor generated from the liquid feed; a series of multi-effect distillation effects, each of the effects coupled with at least one routing selected from the feed routing and the brine routings and with one of the vapor routings for removal of vapor generated in the effect; a series of brine flash boxes coupled with at least one routing selected from the feed routing and the brine routings and with one of the vapor routings for removal of vapor generated in the brine flash box; splitters positioned between the preheaters and configured to split the flow of the liquid feed to selectively direct at least one of (a) a first portion of the flow of the liquid feed from the feed routing through at least one of the multi-effect distillation effects and (b) a second portion of the flow of the liquid feed through a subsequent preheater in the series of preheaters, and to shift allocation of the flow between the first portion and the second portion; and additional splitters, each of which is downstream of a flash box in the series of brine flash boxes in at least one of the brine routings, wherein the additional splitters are configured to selectively direct concentrated brine from each flash box into at least one of (a) a first stream that is directed through one of the brine routings to another flash box in the series of flash boxes and (b) a second stream that is directed through another of the brine routings into another effect, and to shift allocation of flow between the first stream and the second stream, the method comprising:
testing or simulating a variety of configurations of routings, preheaters, multi-effect distillation effects, and brine flash boxes by controlling the allocations of flow established by the splitters;
evaluating at least one property selected from (a) performance ratio of distillate production in said superstructure; (b) specific heat transfer area requirements in the superstructure; (c) recovery ratio; and (d) gained output ratio for each configuration;
reiterating the testing or simulating of different configurations to produce a superstructure in which the property is optimized;
configuring the splitters to establish feed routings through the series of preheaters and through the brine routings that match the optimized superstructure; and
flowing liquid feed through the feed routings that match the optimized superstructure.

13. The method of claim 12, wherein the produced system further includes a thermal vapor compressor coupled with a vapor routing, the method further comprising using the thermal vapor compressor to provide steam to at least one multi-effect distillation effect.

* * * * *